United States Patent [19]
Sato

[11] Patent Number: 4,905,295
[45] Date of Patent: Feb. 27, 1990

[54] CODE SEQUENCE MATCHING METHOD AND APPARATUS

[75] Inventor: Gen Sato, Yokohama, Japan

[73] Assignee: Ricoh Company, Ltd., Japan

[21] Appl. No.: 118,528

[22] Filed: Nov. 9, 1987

[30] Foreign Application Priority Data

Nov. 13, 1986 [JP] Japan .................................. 61-270528
Jul. 8, 1987 [JP] Japan .................................. 62-170510
Oct. 12, 1987 [JP] Japan .................................. 62-256654

[51] Int. Cl.⁴ ............................................... G06K 9/18
[52] U.S. Cl. ......................................... 382/21; 382/34
[58] Field of Search ......................... 382/34, 30, 33, 21

[56] References Cited
U.S. PATENT DOCUMENTS 4,468,808 8/1984 Mori et al. .............................. 382/20
4,644,584 2/1987 Nagashima et al. .................. 382/34
4,757,551 7/1988 Kobayashi et al. ................... 382/21
4,773,098 9/1988 Scott ..................................... 382/21

Primary Examiner—Leo H. Boudreau
Assistant Examiner—Yon Jung
Attorney, Agent, or Firm—Mason, Fenwick & Lawrence

[57] ABSTRACT

A code sequence matching method adapted to pattern recognition of characters compares one code selected from an unknown code sequence which is extracted from an input pattern with one code selected from a reference code sequence. The reference code sequence comprises one or more special codes for controlling an order of comparison between the codes of the unknown and reference code sequence. Then, selecting of the codes from the unknown and reference code sequences is carried out in accordance with the special codes.

8 Claims, 27 Drawing Sheets

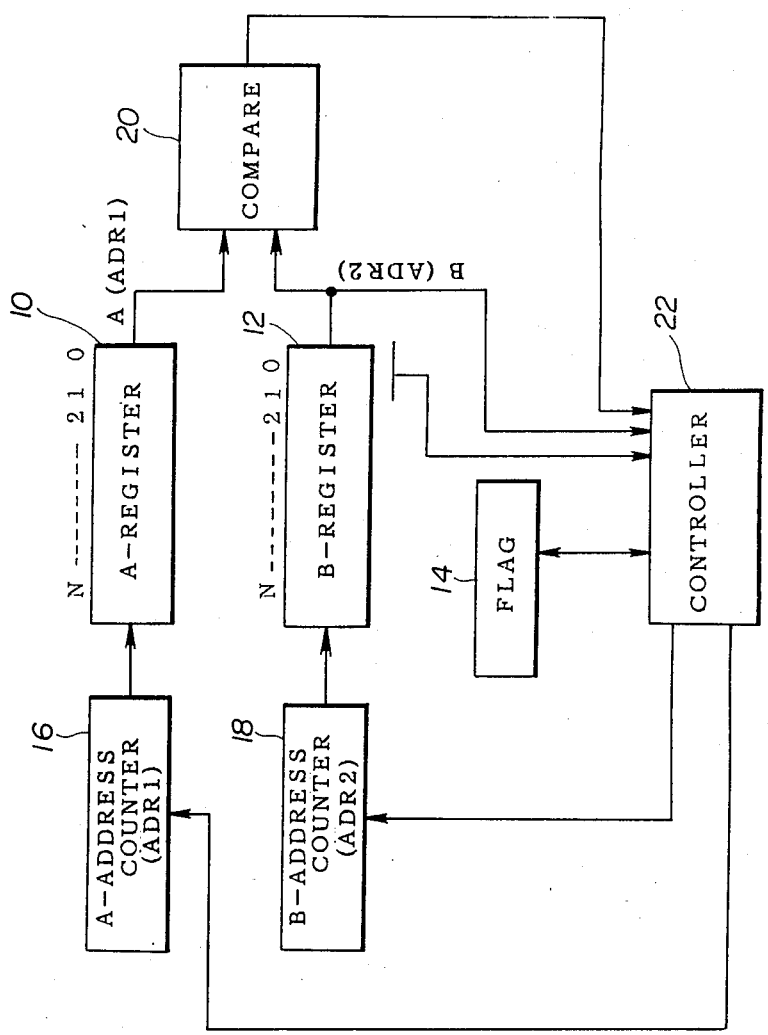

FIG.5

| ADDRESS | 0 | 1 | 2 | 3 | 4 | 5 | 6 | 7 |
|---------|---|---|---|---|---|---|---|---|
| CODE    | 4 | 1 | 2 | 1 | 4 | 3 | 4 | 1 |

FIG.6A

| ADDRESS | 0 | 1 | 2 | 3 | 4 | 5 | RESULT |
|---------|---|---|---|---|---|---|--------|
| CODE    | 0 | 4 | 0 | 2 | 0 | 4 | YES    |

FIG.6B

| ADDRESS | 0 | 1 | 2 | 3 | 4 | RESULT |
|---------|---|---|---|---|---|--------|
| CODE    | 0 | 4 | 0 | 2 | 3 | NO     |

FIG.6C

| ADDRESS | 0 | 1 | 2 | 3 | 4 | 5 | RESULT |
|---------|---|---|---|---|---|---|--------|
| CODE    | 0 | 0 | 4 | 0 | 4 | 1 | YES    |

FIG.7

| STEP | CODE SEQUENCE A | | CODE SEQUENCE B | | FLAG FLG |
|---|---|---|---|---|---|
| | ADDRESS ADR1 | CODE A(ADR1) | ADDRESS ADR2 | CODE B(ADR2) | |
| 1 | 0 | 4 | 1 | 4 | 1 |
| 2 | 0 | 4 | 2 | 0 | 1 |
| 3 | 0 | 4 | 3 | 2 | 0 |
| 4 | 1 | 1 | 3 | 2 | 0 |
| 5 | 2 | 2 | 3 | 2 | 0 |
| 6 | 2 | 2 | 4 | 0 | 1 |
| 7 | 2 | 2 | 5 | 4 | 0 |
| 8 | 3 | 1 | 5 | 4 | 0 |
| 9 | 4 | 4 | 5 | 4 | 1 |

FIG.8

| STEP | CODE SEQUENCE A | | CODE SEQUENCE B | | FLAG FLG |
|---|---|---|---|---|---|
| | ADDRESS ADR1 | CODE A(ADR1) | ADDRESS ADR2 | CODE B(ADR2) | |
| 1 | 0 | 4 | 1 | 4 | 1 |
| 2 | 0 | 4 | 2 | 0 | 1 |
| 3 | 0 | 4 | 3 | 2 | 0 |
| 4 | 1 | 1 | 3 | 2 | 0 |
| 5 | 2 | 2 | 3 | 2 | 0 |
| 6 | 2 | 2 | 4 | 3 | 1 |
| 7 | 3 | 1 | 4 | 3 | 1 |

FIG. 9

| STEP | CODE SEQUENCE A | | CODE SEQUENCE B | | FLAG |
|---|---|---|---|---|---|
| | ADDRESS ADR1 | CODE A(ADR1) | ADDRESS ADR2 | CODE B(ADR2) | FLG |
| 1 | 0 | 4 | 1 | 0 | 1 |
| 2 | 0 | 4 | 2 | 4 | 0 |
| 3 | 0 | 4 | 3 | 0 | 1 |
| 4 | 0 | 4 | 4 | 4 | 0 |
| 5 | 1 | 1 | 4 | 4 | 0 |
| 6 | 2 | 2 | 4 | 4 | 0 |
| 7 | 3 | 1 | 4 | 4 | 0 |
| 8 | 4 | 4 | 4 | 4 | 0 |
| 9 | 4 | 4 | 5 | 1 | 1 |
| 10 | 5 | 3 | 5 | 1 | 1 |
| 11 | | | 1 | 0 | 1 |
| 12 | | | 2 | 4 | 0 |
| 13 | 1 | 1 | 2 | 4 | 0 |
| 14 | 2 | 2 | 2 | 4 | 0 |
| 15 | 3 | 1 | 2 | 4 | 0 |
| 16 | 4 | 4 | 2 | 4 | 0 |
| 17 | 4 | 4 | 3 | 0 | 1 |
| 18 | 4 | 4 | 4 | 4 | 0 |
| 19 | 5 | 3 | 4 | 4 | 0 |
| 20 | 6 | 4 | 4 | 4 | 0 |
| 21 | 6 | 4 | 5 | 1 | 1 |
| 22 | 7 | 1 | 5 | 1 | 1 |

FIG. 10A

| ADDRESS | 0 | 1 | 2 | 3 | RESULT |
|---|---|---|---|---|---|
| CODE | 1 | 0 | 4 | 1 | NO |

FIG. 10B

| ADDRESS | 0 | 1 | 2 | 3 | 4 | 5 | |
|---|---|---|---|---|---|---|---|
| CODE | 1 | 4 | 0 | 2 | 0 | 4 | NO |

FIG. 10C

| ADDRESS | 0 | 1 | 2 | 3 | 4 | |
|---|---|---|---|---|---|---|
| CODE | 1 | 0 | 3 | 4 | 1 | YES |

FIG. 11A

| STEP | CODE SEQUENCE A | | CODE SEQUENCE B | | FLAG |
|---|---|---|---|---|---|
| | ADDRESS ADR1 | CODE A(ADR1) | ADDRESS ADR2 | CODE B(ADR2) | FLG |
| 1 | 0 | 4 | 1 | 0 | 1 |
| 2 | 0 | 4 | 2 | 4 | 0 |
| 3 | 0 | 4 | 3 | 1 | 1 |
| 4 | 1 | 1 | 3 | 1 | 1 |

FIG. 11B

| STEP | CODE SEQUENCE A | | CODE SEQUENCE B | | FLAG |
|---|---|---|---|---|---|
| | ADDRESS ADR1 | CODE A(ADR1) | ADDRESS ADR2 | CODE B(ADR2) | FLG |
| 1 | 0 | 4 | 1 | 4 | 1 |
| 2 | 0 | 4 | 2 | 0 | 1 |
| 3 | 0 | 4 | 3 | 2 | 0 |
| 4 | 1 | 1 | 3 | 2 | 0 |
| 5 | 2 | 2 | 3 | 2 | 0 |
| 6 | 2 | 2 | 4 | 0 | 1 |
| 7 | 2 | 2 | 5 | 4 | 0 |
| 8 | 3 | 1 | 5 | 4 | 0 |
| 9 | 4 | 4 | 5 | 4 | 1 |

FIG. 11C

| STEP | CODE SEQUENCE A | | CODE SEQUENCE B | | FLAG FLG |
|---|---|---|---|---|---|
| | ADDRESS ADR1 | CODE A(ADR1) | ADDRESS ADR2 | CODE B(ADR2) | |
| 1 | 0 | 4 | 1 | 0 | 1 |
| 2 | 0 | 4 | 2 | 3 | 0 |
| 3 | 1 | 1 | 2 | 3 | 0 |
| 4 | 2 | 2 | 2 | 3 | 0 |
| 5 | 3 | 1 | 2 | 3 | 0 |
| 6 | 4 | 4 | 2 | 3 | 0 |
| 7 | 5 | 3 | 2 | 3 | 0 |
| 8 | 5 | 3 | 3 | 4 | 1 |
| 9 | 6 | 4 | 3 | 4 | 1 |
| 10 | 6 | 4 | 4 | 1 | 1 |
| 11 | 7 | 1 | 4 | 1 | 1 |

FIG.12A  FIG.12B  FIG.12C
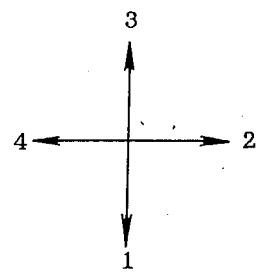
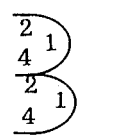
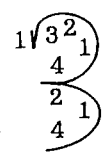
FIG.12D
| ADDRESS | 0 | 1 | 2 | 3 | 4 | 5 | 6 | 7 |
|---|---|---|---|---|---|---|---|---|
| CODE | 1 | 3 | 2 | 1 | 4 | 2 | 1 | 4 |
CODE SEQUENCE A
FIG.12E
| ADDRESS | 0 | 1 | 2 | 3 | 4 | 5 | 6 | 7 |
|---|---|---|---|---|---|---|---|---|
| CODE | 0 | 0 | 2 | 1 | 4 | 2 | 1 | 4 |
CODE SEQUENCE B

FIG. 13

| STEP | CODE SEQUENCE A | | CODE SEQUENCE B | | FLAG |
|---|---|---|---|---|---|
| | ADDRESS ADR1 | CODE A(ADR1) | ADDRESS ADR2 | CODE B(ADR2) | FLG |
| 1 | 0 | 1 | 1 | 0 | 1 |
| 2 | 0 | 1 | 2 | 2 | 0 |
| 3 | 1 | 3 | 2 | 2 | 0 |
| 4 | 2 | 2 | 2 | 2 | 0 |
| 5 | 2 | 2 | 3 | 1 | 1 |
| 6 | 3 | 1 | 3 | 1 | 1 |
| 7 | 3 | 1 | 4 | 4 | 1 |
| 8 | 4 | 4 | 4 | 4 | 1 |
| 9 | 4 | 4 | 5 | 2 | 1 |
| 10 | 5 | 2 | 5 | 2 | 1 |
| 11 | 5 | 2 | 6 | 1 | 1 |
| 12 | 6 | 1 | 6 | 1 | 1 |
| 13 | 6 | 1 | 7 | 4 | 1 |
| 14 | 7 | 4 | 7 | 4 | 1 |

FIG. 16

| ADDRESS | CONTENT |
|---|---|
| 0 | CHARACTER CODE |
| 1 | MODE IDENTIFIER |
| 2 | JUMP DESTINATION ADDRESS |
| 3 | NUMBER OF CODES |
| 4 | DICTIONARY CODE SEQUENCE |
| $n$ | CHARACTER CODE |
| $n+1$ | MODE IDENTIFIER |
| $n+2$ | JUMP DESTINATION ADDRESS |
| $n+3$ | NUMBER OF CODES |
| $n+4$ | DICTIONARY CODE SEQUENCE |
| $m$ | CHARACTER CODE |
| $m+1$ | MODE IDENTIFIER |
|  | FF (TERMINATOR) |

DICTIONARY UNIT

FIG.17

| ADDRESS | CONTENT | |
|---|---|---|
| 0 | α | CHARACTER CODE |
| 1 | 00 | MODE IDENTIFIER |
| 2 | 8 | JUMP DESTINATION ADDRESS |
| 3 | 4 | NUMBER OF CODES |
| 4 | 4 | DICTIONARY CODE SEQUENCE |
| 5 | 0 | |
| 6 | 2 | |
| 7 | 3 | |
| 8 | 0 | CHARACTER CODE |
| 9 | 01 | |
| 10 | 24 | |
| 11 | 5 | |
| 12 | 4 | DICTIONARY CODE SEQUENCE |
| 13 | 0 | |
| 14 | 2 | |
| 15 | 0 | |
| 16 | 4 | |
| 17 | 0 | |
| 18 | 11 | |
| 19 | 33 | |
| 20 | 3 | |
| 21 | 3 | |
| 22 | 4 | |
| 23 | 1 | |
| 24 | β | |
| 25 | 10 | |
| 26 | 33 | |
| 27 | 5 | |
| 28 | 4 | |
| 29 | 0 | |
| 30 | 2 | |
| 31 | 0 | |
| 32 | 4 | |
| 33 | α | |
| 34 | 00 | |
| 35 | 42 | |
| 36 | 5 | |
| 37 | 0 | |
| 38 | 4 | |
| 39 | 0 | |
| 40 | 4 | |
| 41 | 1 | |
| 42 | FF | TERMINATOR |

Groups: I (0–7), II (8–16), III (17–23), IV (24–32), V (33–41)

FIG.20A

| ADDRESS | 0 | 1 | 2 | 3 | 4 | | RESULT |
|---|---|---|---|---|---|---|---|
| CODE | 4 | 0 | 2 | 0 | 4 | | YES |

FIG.20B

| ADDRESS | 0 | 1 | 2 | 3 | | | |
|---|---|---|---|---|---|---|---|
| CODE | 4 | 0 | 2 | 3 | | | NO |

FIG.20C

| ADDRESS | 0 | 1 | 2 | 3 | 4 | | |
|---|---|---|---|---|---|---|---|
| CODE | 0 | 4 | 0 | 4 | 1 | | YES |

FIG.24A

| ADDRESS | 0 | 1 | 2 | | | | RESULT |
|---|---|---|---|---|---|---|---|
| CODE | 0 | 4 | 1 | | | | NO |

FIG.24B

| ADDRESS | 0 | 1 | 2 | 3 | 4 | | |
|---|---|---|---|---|---|---|---|
| CODE | 4 | 0 | 2 | 0 | 4 | | NO |

FIG.24C

| ADDRESS | 0 | 1 | 2 | 3 | | | |
|---|---|---|---|---|---|---|---|
| CODE | 0 | 3 | 4 | 1 | | | YES |

FIG.21

| STEP | CODE SEQUENCE A | | CODE SEQUENCE B | | FLAG FLG |
|---|---|---|---|---|---|
| | ADDRESS ADR1 | CODE A (ADR1) | ADDRESS ADR2 | CODE B (ADR2) | |
| 1 | 0 | 4 | 0 | 4 | 1 |
| 2 | 0 | 4 | 1 | 0 | 1 |
| 3 | 0 | 4 | 2 | 2 | 0 |
| 4 | 1 | 1 | 2 | 2 | 0 |
| 5 | 2 | 2 | 2 | 2 | 0 |
| 6 | 2 | 2 | 3 | 0 | 1 |
| 7 | 2 | 2 | 4 | 4 | 0 |
| 8 | 3 | 1 | 4 | 4 | 0 |
| 9 | 4 | 4 | 4 | 4 | 1 |

FIG.22

| STEP | CODE SEQUENCE A | | CODE SEQUENCE B | | FLAG FLG |
|---|---|---|---|---|---|
| | ADDRESS ADR1 | CODE A (ADR1) | ADDRESS ADR2 | CODE B (ADR2) | |
| 1 | 0 | 4 | 0 | 4 | 1 |
| 2 | 0 | 4 | 1 | 0 | 1 |
| 3 | 0 | 4 | 2 | 2 | 0 |
| 4 | 1 | 1 | 2 | 2 | 0 |
| 5 | 2 | 2 | 2 | 2 | 0 |
| 6 | 2 | 2 | 3 | 3 | 1 |
| 7 | 3 | 1 | 3 | 3 | 1 |

FIG.23

| | UNKNOWN CODE SEQUENCE | | DICTIONARY CODE SEQUENCE | | FLAG |
|---|---|---|---|---|---|
| | ADDRESS ADR1 | CODE A (ADR1) | ADDRESS ADR2 | CODE B (ADR2) | FLG |
| 1 | 0 | 4 | 0 | 0 | 1 |
| 2 | 0 | 4 | 1 | 4 | 0 |
| 3 | 0 | 4 | 2 | 0 | 1 |
| 4 | 0 | 4 | 3 | 4 | 0 |
| 5 | 1 | 1 | 3 | 4 | 0 |
| 6 | 2 | 2 | 3 | 4 | 0 |
| 7 | 3 | 1 | 3 | 4 | 0 |
| 8 | 4 | 4 | 3 | 4 | 0 |
| 9 | 4 | 4 | 4 | 1 | 1 |
| 10 | 5 | 3 | 4 | 1 | 1 |
| 11 | | | 0 | 0 | 1 |
| 12 | | | 1 | 4 | 0 |
| 13 | 1 | 1 | 1 | 4 | 0 |
| 14 | 2 | 2 | 1 | 4 | 0 |
| 15 | 3 | 1 | 1 | 4 | 0 |
| 16 | 4 | 4 | 1 | 4 | 0 |
| 17 | 4 | 4 | 2 | 0 | 1 |
| 18 | 4 | 4 | 3 | 4 | 0 |
| 19 | 5 | 3 | 3 | 4 | 0 |
| 20 | 6 | 4 | 3 | 4 | 0 |
| 21 | 6 | 4 | 4 | 1 | 1 |
| 22 | 7 | 1 | 4 | 1 | 1 |

FIG.26

| ADDRESS | CONTENT |
|---|---|
| 0 | CHARACTER DODE |
| 1 | MODE IDENTIFIER |
| 2 | JUMP DESTINATION ADDRESS |
| 3 | NUMBER OF CODES |
| 4 | CODE |
| 5 | LENGTH |
| 6 | CODE |
| 7 | LENGTH |
|  | ⋮ |
| n | CHARACTER CODE |
| n+1 | MODE IDENTIFIER |
| n+2 | JUMP DESTINATION ADDRESS |
| n+3 | NUMBER OF CODES |
| n+4 | CODE |
| n+5 | LENGTH |
|  | ⋮ |
|  | FF TERMINATOR |

(Addresses 0–7 form one DICTIONARY UNIT; addresses 4–7 etc. form a CODE SEQUENCE)

FIG.29

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CODE&LENGTH | 4 | 5 | 1 | 10 | 2 | 6 | 1 | 5 | 4 | 7 | 3 | 8 | 4 | 6 | 1 | 5 |

FIG.30A

| ADDRESS | 0 | 1 | 2 | 3 | 4 | 5 | 6 | 7 | 8 | 9 | RESULT |
|---|---|---|---|---|---|---|---|---|---|---|---|
| CODE&LENGTH | 4 | 6 | 0 | 0 | 2 | 4 | 0 | 0 | 4 | 6 | YES |

FIG.30B

| ADDRESS | 0 | 1 | 2 | 3 | 4 | 5 | 6 | 7 | 8 | 9 | RESULT |
|---|---|---|---|---|---|---|---|---|---|---|---|
| CODE&LENGTH | 4 | 6 | 0 | 0 | 2 | 4 | 0 | 0 | 4 | 3 | NO |

← MISMATCH

FIG. 31

| STEP | UNKNOWN CODE SQUENCE | | DICTIONARY CODE SEQUENCE | | FLAG FLG |
|---|---|---|---|---|---|
| | ADDRESS ADR A | COD&LEN A (ADR A) | ADDRESS ADR B | COD&LEN B (ADR B) | |
| 1 | 0 | 4 | 0 | 4 | 1 |
| 2 | 1 | 5 | 1 | 6 | 1 |
| 3 | 1 | 5 | 2 | 0 | 1 |
| 4 | 1 | 5 | 4 | 2 | 0 |
| 5 | 2 | 1 | 4 | 2 | 0 |
| 6 | 4 | 2 | 4 | 2 | 0 |
| 7 | 5 | 6 | 5 | 4 | 0 |
| 8 | 5 | 6 | 6 | 0 | 1 |
| 9 | 5 | 6 | 8 | 4 | 0 |
| 10 | 6 | 1 | 8 | 4 | 0 |
| 11 | 8 | 4 | 8 | 4 | 0 |
| 12 | 9 | 7 | 9 | 6 | 1 |

CODE SEQUENCE MATCHING METHOD AND APPARATUS

BACKGROUND OF THE INVENTION

The present invention generally relates to a code sequence matching method for recognizing characters, and in particular to a code sequence matching method for matching between a sequence of feature vectors extracted from an input unknown pattern and a sequence of feature vectors which are stored beforehand in a dictionary. Further, the present invention relates to a code sequence matching apparatus carrying out the above method. The present invention is especially suitable for recognition of handwritten characters.

Conventionally, an apparatus for recognizing patterns of characters has a dictionary in which sequences of feature vectors of many kinds of patterns (dictionary feature sequences) are registered. Dictionary feature sequences are also referred to as dictionary code sequences, because in general feature vectors are described with directional codes. The apparatus refers to the dictionary and retrieves a dictionary feature sequence therefrom which coincides with a sequence of feature vectors extracted from an input unknown pattern (an unknown feature sequence). The unknown feature sequence is also referred to as an unknown code sequence. Then, the apparatus determines a candidate pattern for the unknown pattern.

According to a conventional code sequence matching method, all the elements of the unknown code sequence extracted from the input pattern are compared with all the elements of the dictionary code sequence read out from the dictionary. Then, only when all the elements of the unknown code sequence correspond to all the elements of the dictionary code sequence from the point of view of kind, number and sequence of elements, both the patterns are recognized to match each other, so that the input unknown pattern can be identified. In other words, a correspondence of all the elements of the unknown code sequence with all the elements of the dictionary code sequence is definitely defined for identifying the unknown pattern. However, the above matching method is liable to be affected by noise and/or pattern deformation on the input pattern. For this reason, a pattern recognition rate is degraded.

To improve the pattern recognition rate, it is useful to partially neglect the elements of the unknown code sequence and compare the remaining elements thereof with the elements of the dictionary code sequences. It is also useful to change the correspondence of elements to be compared with each other.

However, even these matching methods can not provide a satisfactory recognition rate, when only one dictionary code sequence is prepared for one pattern. This is because these matching methods cannot effectively cope with deformation or the like on patterns. Therefore, it is required to prepare a plurality of dictionary code sequences for one pattern in the dictionary. Furthermore, when one candidate for the input pattern is selected from among a plurality of the candidate patterns (when determining whether the input pattern is a pattern α or β, or neither α or β, for example), it is necessary to suitably control a sequence for retrieving proper dictionary code sequences and finally determining one candidate out of the plurality of candidates. That is, it is very important to suitably couple the dictionary code sequences with one another with some information and control a sequence for the dictionary retrieval.

According to a recently reported matching method, controls for changing the correspondence of elements between the unknown code sequence and the dictionary code sequences and the sequence for the dictionary retrieval are carried out by using a state transition diagram (see Y. Kato, "AUTOMATIC PRODUCTION METHOD OF A DICTIONARY FOR THE PATTERN RECOGNITION", Technical Research Report PRL85-35, The Institute of Electronics and Communication Engineers of Japan, 1985). However, the controls are very complicated and cumbersome.

SUMMARY OF THE INVENTION

It is a general object of the present invention to provide a novel and useful code sequence matching method in which the disadvantages of the conventional pattern matching method have been eliminated.

A more specific object of the present invention is to provide a code sequence matching method in which a correspondence relationship of elements (codes) of feature vectors extracted from an input pattern to elements (codes) of feature vectors which are registered beforehand in a dictionary can easily be modified.

Another object of the present invention is to provide a code sequence matching method in which a sequence of a dictionary retrieval is simply controlled.

Still another object of the present invention is to provide a code sequence matching method which is not affected by pattern deformation.

A further object of the present invention is to provide a code sequence matching method in which a pattern recognition rate is improved.

The above objects of the present invention are attained by a code sequence matching method comprising the steps of successively selecting one code from an unknown code sequence which is extracted from an input pattern and indicates a sequence of features of the input pattern; successively selecting one code from a reference code sequence; comparing the one code selected from the unknown code sequence with the one code selected from the reference code sequence; and discriminating whether or not the unknown code sequence and the reference code sequence match by checking a correspondence between the codes of the unknown code sequence and the codes of the reference code sequence. In this method, the reference code sequence has one or more special codes for controlling an order of comparison between the codes of the unknown code sequence and the codes of the reference code sequence.

A still further object of the present invention is to provide a code sequence matching apparatus executing the above method.

Other objects and features of the present invention will become apparent from the following detailed description when read in conjunction with the attached drawings.

BRIEF DESCRIPTION OF THE DRAWINGS

FIG. 1 is a block diagram of a configuration of a first embodiment according to the present invention;

FIG. 5 is a view showing an example of an input unknown code sequence;

FIGS. 6A through 6C are views each showing examples of a dictionary code sequence in which a matching based on a partial correspondence is designated;

FIG. 7 is a view showing transitions of addresses, codes and flag when the dictionary code sequence shown in FIG. 6A is used for the input code sequence shown in FIG. 5;

FIG. 8 is a view showing transitions of addresses, codes and flag when the dictionary code sequence shown in FIG. 6B is used for the input code sequence shown in FIG. 5;

FIG. 9 is a view showing transitions of addresses, codes and flag when the dictionary code sequence shown in FIG. 6C is used for the input code sequence shown in FIG. 5;

FIGS. 10A through 10C are views each showing examples of a dictionary code sequence in which a matching based on an overall correspondence is designated;

FIG. 11A is a view showing transitions of addresses, codes and flag when the dictionary code sequence shown in FIG. 10A is used for the input code sequence shown in FIG. 5;

FIG. 11B is a view showing transitions of addresses, codes and flag when the dictionary code sequence shown in FIG. 10B is used for the input code sequence shown in FIG. 5;

FIG. 11C is a view showing transitions of addresses, codes and flag when the dictionary code sequence shown in FIG. 10C is used for the input code sequence shown in FIG. 5;

FIGS. 12A through 12E are views for explaining a practical example of the matching;

FIG. 13 is a view showing transitions of addresses, codes and flag in the case shown in FIGS. 12A through 12E;

FIG. 16 is a view showing a structure of a dictionary used in the second embodiment;

FIG. 17 is a view showing an example of a dictionary having the structure shown in FIG. 16;

FIGS. 20A through 20C are views each showing examples of the dictionary code sequence stored in the dictionary shown in FIG. 17;

FIG. 21 is a view showing transitions of addresses, codes and flag when the dictionary code sequence is selected for the input code sequence shown in FIG. 5;

FIG. 22 is a view showing transitions of addresses, codes and flag when the dictionary code sequence is selected used for the input code sequence shown in FIG. 5;

FIG. 23 is a view showing transitions of addresses, codes and flag when the dictionary code sequence is selected for the input code sequence shown in FIG. 5;

FIGS. 24A through 24C are views each showing examples of the dictionary code sequence

FIG. 26 is a view showing a structure of dictionary used in the third embodiment;

FIG. 29 is a view showing the input code sequence shown in FIG. 27, in which length information is shown together with the corresponding codes;

FIGS. 30A and 30B are views each showing examples of the dictionary code sequence used in the third embodiment;

FIG. 31 is a view showing transitions of addresses, codes and flag when the dictionary code sequence shown in FIG. 30B is selected for the input unknown code pattern shown in FIG. 29.

DETAILED DESCRIPTION

Figure 2A:
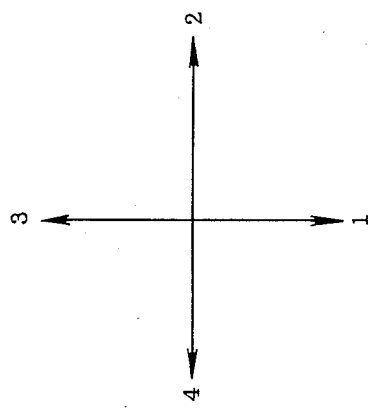
FIGS. 2A through 2D are views for explaining a structure of a code sequence.

As described before, an input unknown code sequence extracted from an input pattern is matched with dictionary code sequences which are registered beforehand in a dictionary. One of the features of the present invention is that the dictionary code sequences may have one or more special codes. The special codes are utilized to change the correspondence between elements of the unknown code sequence and elements of dictionary code sequence to be compared with each other. Another feature of the present invention is that dictionary code sequences may have a mode code for designating a matching mode. According to the present invention, a partial correspondence mode and an overall correspondence mode are used.

A description will be given on a first embodiment according to the present invention.

FIG. 1 is a block diagram of a configuration for carrying out a code sequence matching method of the first embodiment. Referring to this figure, an A-register 10 stores an input unknown code sequence extracted from an input pattern. The unknown code sequence is composed of codes representing feature vectors. These codes indicate directions of strokes of the pattern to be matched, for example. The codes are successively stored in the A-register 10 starting with an address 0. Hereafter, the input unknown code sequence is referred to as a code sequence A.

A B-register 12 stores a dictionary code sequence which is registered beforehand in a dictionary (not shown). The dictionary code sequence includes predetermined codes representing feature vectors. These codes are successively stored in the B-register 12 starting with an address 1. Hereafter, the second code sequence is referred to as a code sequence B.

The code sequence B may have one or more special codes as indicated previously. The special codes are utilized to change the correspondence between codes of the code sequence A and codes of the code sequence B. A special code is represented by numeral 0 in this embodiment. The special code may be placed at regions of the B-register other than a region designated by the address 0. For example, the special code 0 has a function of eliminating unnecessary codes included in the code sequence A to be compared with the codes of the code sequence B. In addition, the special code indicates repeat of matching of the code sequence A with the code sequence B. At this time, codes of the code sequence A to be subjected to matching are selectively designated every time the matching is repeated. The presence of the special code makes it possible to effectively cope with positional displacement of handwritten patterns with respect to predetermined coordinates and deformation of patterns. Moreover, the code sequence B may have a mode code for designating an operational mode of matching. As described before, the partial correspondence mode and the overall correspondence mode are prepared as the operational modes. The mode code is stored in an region of the address 0 of the B-register 12. These modes will be described in detail later.

In order to facilitate a better understanding, a code sequence and a special code is briefly described. As shown in FIG. 2A, codes in the code sequence indicate directions of a stroke of a character pattern, for example. The illustrated example is composed of 4 directions. The directions 7 are represented by numerals (codes) 1–4. For example, a pattern of a numeral "5" shown in FIG. 2B has codes 4, 1, 2, 1 and 4, which form a code sequence in this sequence. A pattern of a numeral "5" shown in FIG. 2C which is slightly deformed has codes 4, 1, 3, 1 and 4, which form a code sequence in this sequence. These directional codes may be obtained by tracing a stroke along a contour of a pattern.

Figure 2B:
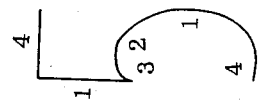
Figure 2C:
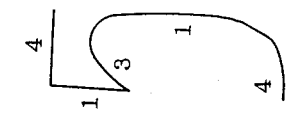
Figure 2D:
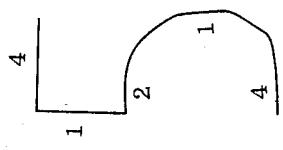

If a dictionary code sequence of numeral "5" is described as (4, 1, 2, 1, 4), it would be easily understood that the pattern shown in FIG. 2B can be identified as numeral "5". To the contrary, the pattern shown in FIG. 2C would not be identified, because the code sequence thereof is different from the above dictionary code sequence. However, the pattern shown in FIG. 2C must be identified as numeral "5". It should be noted that both the patterns illustrated commonly own the codes 4, 1, 1 and 4. This means that the code "2" or "3" intervening between the codes 1 is unnecessary to identify the pattern of numeral "5". For this reason, a dictionary code sequence for numeral "5" may be described as (4, 1, 0, 1, 4). The code 0 is the special code which indicates that a code in the unknown code sequence located at a position corresponding to the special code 0 in the dictionary code sequence is neglected upon matching. Therefore, the code "2" included in the code sequence shown in FIG. 2B or the code "3" included in the code sequence shown in FIG. 2C is neglected, so that the code sequence which is subject to the matching is (4, 1, 1, 4). Consequently, the pattern can be identified as numeral "5" by use of the dictionary code sequence (4, 1, 0, 1, 4). The code to be neglected due to the special code 0 is not limited to one code, but a plurality of codes may be neglected. For example, an unknown code sequence (4, 1, 3, 2, 1, 4) as shown in FIG. 2D would be identified as numeral "5", because the codes 3 and 2 are neglected at the time of the matching process. The special code 0 may be placed at the top of the dictionary code sequence. Functions of the special code 0 will be further described later.

Returning to FIG. 1, a read address ADR1 for the A-register 10 is designated by an A-address counter 16, and a read address ADR2 for the B-register 12 is designated by a B-address counter 18. The codes read out from both the registers 10 and 12 are compared with each other by a comparator 20. A compared result is supplied to a controller 22. In addition, the controller 22 receives the code of the address 0 of the B-register 12 and the special code 0 from the B-register 12. The controller 22 controls a matching process. In addition, the controller 22 controls a flag register 14 and the address counters 16 and 18.

Figure 3:
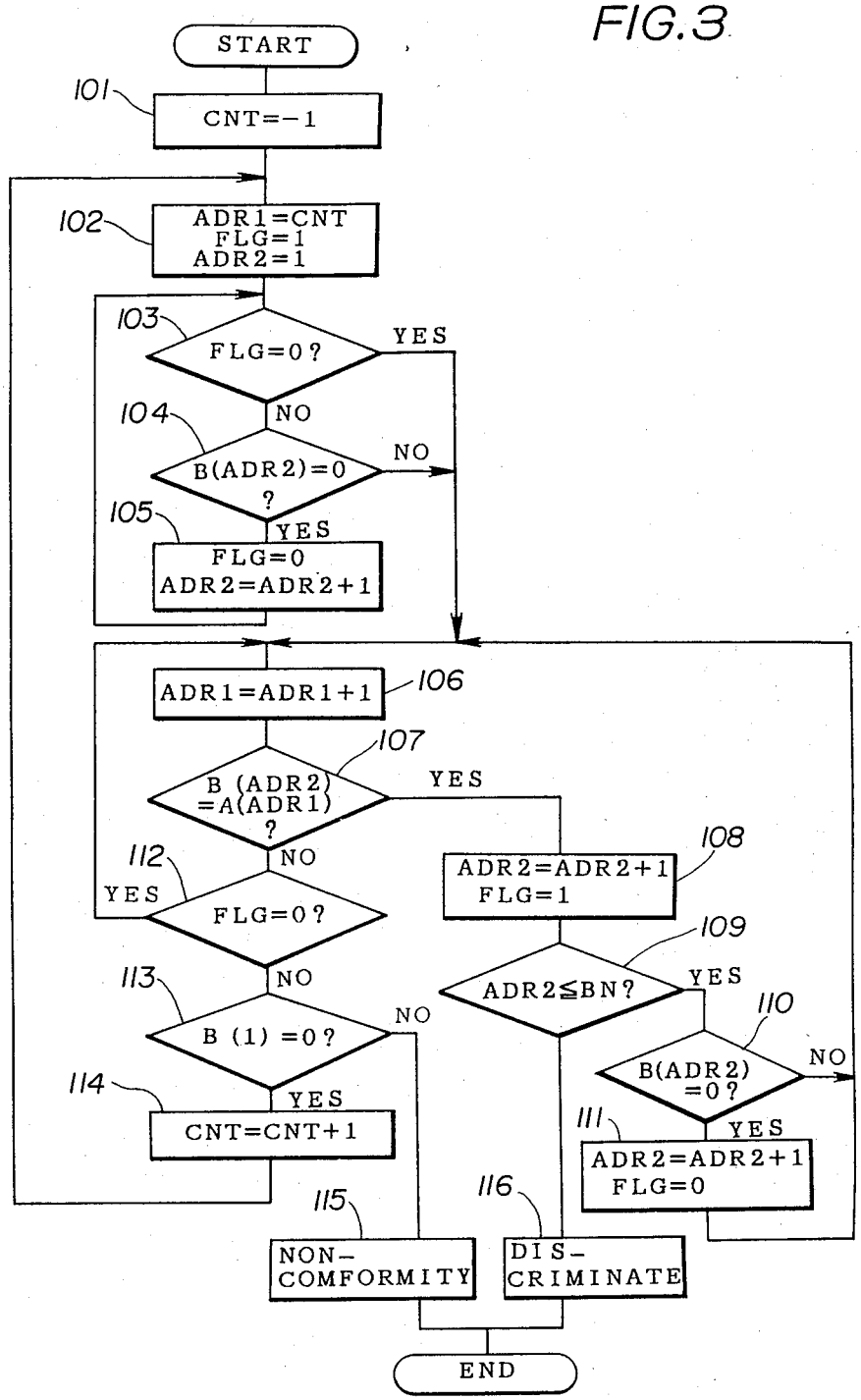
FIGS. 3 and 4 are flow charts showing a sequence of steps of a code sequence matching process in the first embodiment.
Figure 4:
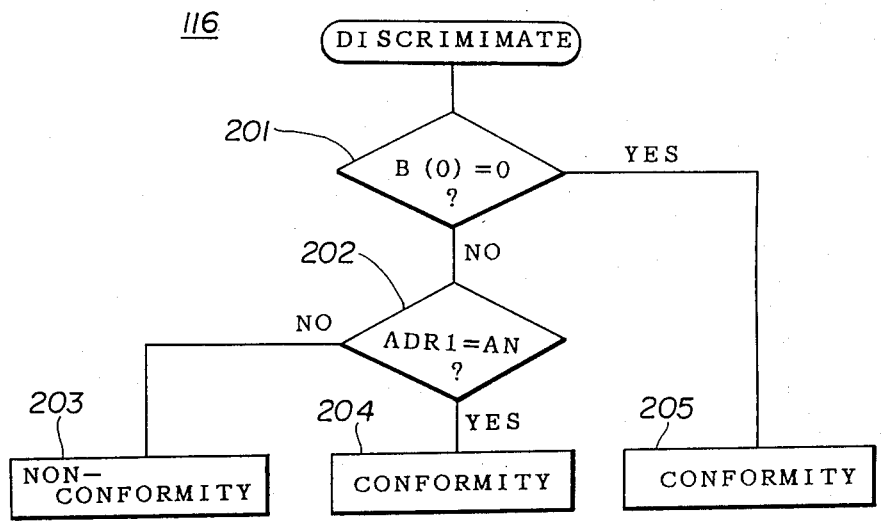

A controlling sequence of the controller 22 is shown FIGS. 3 and 4. A summary of the controlling sequence is as follows. In FIG. 3, steps 101 and 102 are steps for an initial setting. Steps 103 through 105 are steps for reading out a code designated by the address 2 from the B-register 12 when the code of the address 1 of the B-register 12 is the special code 0. When the code read out from the B-register 12 is not the special code 0, a matching between the code from the A-register 10 and the code from the B-register 12 is made in accordance with a sequence composed of steps 106 - 107 - 108 - 109 - 110 - 106. When the code read out from the B-register 12 is the special code 0, a matching between the code from the A-register 10 and the code from the B-register 12 is made in accordance with a sequence composed of 106, 107 and 112. Step 111 is a step for incrementing the count of the B-address 18 by 1, when the special code 0 is read out from the B-register 12. Steps 113 and 114 are steps for performing an initial setting for the code sequence A and repeating the matching process, when both the codes are different from each other at step 107 and the code of the address 1 is the special code at step 113. Step 201 shown in FIG. 4 is a step for discriminating whether or not a currently processed matching is based on the partial correspondence or the overall correspondence. Step 202 is a step for discriminating whether or not a currently processed code of the code sequence A belongs to a last code designated by a last (maximum) address AN.

A more detailed description of the matching process will be given by referring to FIGS. 3 and 4.

The controller 22 sets a built-in CNT counter to $-1$ (step 101). Then, the controller 22 sets the A-address counter 16 to the value of the CNT counter, and sets the B-address counter 18 to 0, and sets a flag FLG in the flag register 14 to 1.

Then, the controller 22 checks whether or not the flag register 14 is in a reset state of the value 0 (step 103), and jumps to step 106 if the result at step 103 is affirmative. If the result at step 103 is negative, or the flag register 14 is in a set state of the value 1, the controller 22 checks whether or not a code B(ADR2) derived from the B-register 12 is 0 (special code). If the result is negative, the controller 22 jumps to step 106. Alternatively, if the code is the special code, the controller 22 resets the flag register 14, and increments the count of the B-address counter 18 by 1, and returns to the step 103.

At step 106, the controller 22 increments the count ADR1 of the A-address counter 16 by 1 and reads out a code designated by the next address. The comparator 20 compares the code A(ADR1) with the code B(ADR2) from the B-register 12 (step 107). If both the codes are identical to each other, the controller 22 increments the count of the B-address counter 18 by 1 and reads out a code designated by the next address (step 108). At this time, the controller 22 sets the flag register 14. Then, the controller 22 checks whether or not the value of the B-address counter 12 is equal to or less than a last (maximum) address BN of the code sequence B (step 109).

If the result is affirmative, the controller 22 checks whether or not the code which is read out from the B-register 12 at step 108 is the special code (step 110). If this code is not the special code, the controller 22 returns to the step 106 and increments the count of the A-address counter 16 by 1 and reads out a code designated by the next address. To the contrary, if the result at step 110 is affirmative, the controller 22 increments the count of the B-address counter 18 by 1 and reads out a code designated by the next address (step 111). At this time, the controller 22 resets the flag register 22. Then, the process returns to step 106.

If the result at step 109 is negative, the controller 22 proceeds to step 116. A detailed function at step 116 is shown in FIG. 4. First, the controller 22 checks whether or not the code B(0) of the address 0 is the code 0 (step 201). If this code is 0, or the matching mode based on the partial correspondence is indicated, the controller 22 decides that the code sequence A matched with the code sequence B (step 205). If the result at step 201 is negative, the controller 22 checks a current value of the A-address counter 16 (step 202). If the address of the counter 16 coincides with the last (maximum) address AN of the code sequence A, the controller 22 decides that the code sequence A matches with the code sequence B (step 204). If the result at step 202 is negative, the controller 22 decides that neither of the sequences match each other (step 203).

Returning to FIG. 3, if the code of the code sequence A does not coincide with the code of the code sequence B at step 107, the controller 22 checks the state of the flag register 14 (step 112). If the flag register 14 is in the reset state, the controller 22 returns to the step 106 and reads out a code designated by the next address from the A-register 10. To the contrary, if the flag register 14 is in the set state, the controller 22 checks the code of the address 1 of the code sequence B (step 113). If the result at step 113 is negative, or the code of the address 1 is not the special code, the controller 22 decides that the code sequence A does not match with the code sequence B (step 115). If the result at step 113 is affirmative, the controller 22 increments the count of the CNT counter by 1 and returns to step 102. Then, the controller 22 tries again the matching between the code sequence A and the code sequence B. In this matching, a start code of the code sequence A which is subject to the matching is not the code of the address 0 but the code of the address 1. It should be noted that in the first matching process, the address 0 is the start address for the matching. By changing the start address of the code sequence A which is subject to the matching, it becomes possible to cope with positional displacement and deformation of patterns.

The matching process of the first embodiment will be further described with examples.

An example of the code sequence A is shown in FIG. 5, and examples of the code sequence B are shown in FIGS. 6A to 6C. The matching mode based on the partial correspondence is designated in the illustrated code sequences B. That is, the code of the address 0 is 0 in each code sequence B.

First, a matching of the code sequence A shown in FIG. 5 with the code sequence B shown in FIG. 6A is described. Transitions of addresses (ADR1, ADR2), codes (A(ADR1), B(ADR2)) and flag (FLG) are illustrated in FIG. 7. At step in FIG. 7, the flag register 14 is set to 1 (the initial setting), and the code 4 of the address 0 of the code sequence A and the code 4 of the address 1 of the code sequence B are read out and compared with each other. Since both the codes are identical to each other, the code of the address 2 of the code sequence B is read out (step 2). Since the code of the address 2 of the code sequence B is 0, the code 2 of the address 3 of the code sequence B is subsequently read out (step 3). At this time, the flag is reset. Then, the code 1 of the address 1 of the code sequence A is read out (step 4). The code 1 of the address 1 of the code sequence A is not identical to the code 2 of the address 3 of the code sequence B, and therefore is neglected. Then, the code 2 of the address 2 of the code sequence A is read out and is compared with the code 2 of the address 3 of the code sequence B (step 5). Because both the codes are identical to each other, the code of the address 4 of the code sequence B is read out and the flag is set (step 6). The code of the address 4 of the code sequence B is 0. Therefore, the code 4 of the address 5 of the code sequence B is read out and the flag is reset (step 7). Then, the code 1 of the address 3 of the code sequence A is read out (step 8). Because this code does not coincide with the code 4 of the address 5 of the code sequence B, it is neglected. Then, the code 4 of the address 4 of the code sequence A is read out and is compared with the code 4 of the address 5 of the code sequence B (step 9). Both the codes coincide with each other. The address 5 is the last address of the code sequence B. As described before, the code of the address 0 of the code sequence B is 0 and thereby the partial correspondence is designated as the matching mode. Thus, even though the matching process has not yet reached to the final address 7 corresponding to the last code of the code sequence A, it is decided that the the code sequence A matches with the code sequence B.

A matching between the code sequence A shown in FIG. 5 and the code sequence shown in FIG. 6B is described. Transitions of addresses, codes and flag in this case are shown in FIG. 8. Referring to this figure, the matching processed by steps 1 to 5 is the same as the matching made by the steps 1 to 5 shown in FIG. 7. At step 6, the code 3 of the address 4 of the code sequence B is read out, because both the codes are identical to each other at step 5. Then, the code 1 of the address 3 of the code sequence A is read out and is then compared with the code 3 of the address 4 of the code sequence A (step 7). Since both the codes are not the same, the matching process is terminated, and it is decided that the code sequence A does not match with the code sequence B.

A matching between the code sequence A shown in FIG. 5 and the code sequence B shown in FIG. 6C is described. As shown in FIG. 6C, the special code 0 is inserted into the region of the address 1. In this case, it is repeatedly checked whether or not a sequence of codes starting with the address 2 in the code sequence B exists in the code sequence A. At this time, a start address of the code sequence A to be subject to matching is modified every time the matching is repeated. Transitions of addresses, codes and flag are shown in FIG. 9.

Referring to this figure, the flag is initially set (step 1). Then the code of the address 0 of the code sequence A and the code of the address 1 of the code sequence B are read out. The code of the address 1 of the code sequence B is 0. Therefore, the code 4 of the address 2 of the code sequence B is read out (step 2). This address is the start address for the matching and the matching begins. A description about the matching made by the steps 2 to 9 are omitted, because it is the same as in the case shown in FIG. 7. Then, at step 9, the code 1 of the last address of the code sequence B is read out. Then, the code 3 of the address 5 of the code sequence A is read out (step 10). Both the codes are compared with each other. Both the codes are different. In this case, if the code of the address 1 of the code sequence B were not 0, it would be decided that neither of the code sequences match each other. However, the code of the address 1 of the code sequence B is the special code 0. Thus, the code 4 of the address 2 of the code sequence B is again read out (step 12), and then the code 1 of the address 1 of the code sequence A is read out (step 13). Then the matching is tried again. In this way, the sequence of the codes (4, 4, 1) of the code sequence B is found in the code sequence A. In this example, the code sequence (4, 4, 1) can be found at the addresses 4, 6 and 7 of the code sequence A, respectively. As a result, it is decided that the code sequence A matches with the code sequence B.

FIGS. 10A through 10C show examples of the code sequence B in which the overall correspondence is designated. In the following explanation, the code sequence shown in FIG. 5 is used as the code sequence A. The matching process based on the overall correspondence are almost the same as the matching process based on the partial correspondence except for the following. As described previously, in the matching based on the overall correspondence, when it is detected that all the codes starting with the address 1 or 2 in the code sequence B exist in the code sequence A, the current address of the code sequence A is checked. This operation is executed at step 202 shown in FIG. 4. If the current address is the last address corresponding to the last code of the code sequence A, it is decided that the code sequences A matches with the code sequence B. To the contrary, if the current address is not the last address, it is decided that the code sequences A does not match with the code sequence B.

A matching of the code sequence A shown in FIG. 5 with the code sequence B shown in FIG. 10A is made as shown in FIG. 11A. As shown in this figure, when all the codes (4, 1) of the code sequence B are detected in the code sequence A, the address of the code sequence A is 1. The address 1 is not the last address of the code sequence A, because the last address is 7 shown in FIG. 5. Therefore, neither of the code sequences match.

A matching of the code sequence A shown in FIG. 5 with the code sequence B shown in FIG. 10B made as shown in FIG. 11B. As shown in this figure, when all the codes (4, 2, 4) of the code sequence B are detected in the code sequence A, the address of the code sequence A is 4 and is not the last address. Thus, neither of the code sequences match each other.

A matching of the code sequence A shown in FIG. 5 with the code sequence B shown in FIG. 10C is made as shown in FIG. 11C. In this case, when all the codes (3, 4, 1) of the code sequence B are detected in the code sequence A, the address of the code sequence A is 7, which is the last address. Thus, both the code sequences match.

An example of a concrete application of the present invention for handwritten numeral patterns is described. In this example, directional codes representing feature vectors obtained a stroke along a contour of a pattern, as shown in FIG. 12A. Examples of handwritten patterns of numeral "3" are shown in FIGS. 12B and 12C. FIG. 12D shows the code sequence A extracted from the handwritten pattern and FIG. 12E shows the code sequence B which is beforehand prepared. Transitions of addresses, codes and flag are shown in FIG. 13. As shown in FIG. 13, the code sequence A shown in FIG. 12D matches with the code sequence shown in FIG. 12E, so that the pattern shown in FIG. 12C may be identified as numeral "3".

A description will be given on a second embodiment according to the present invention.

Figure 14:
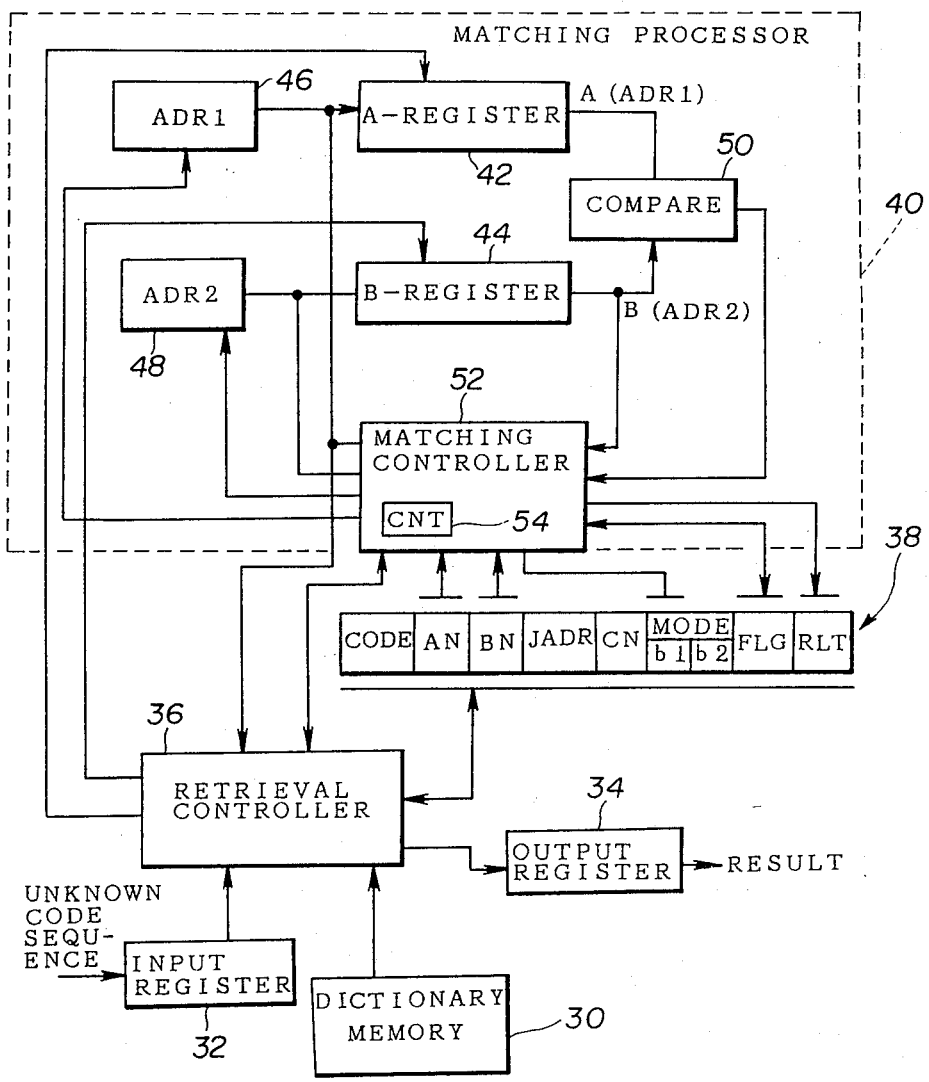
FIG. 14 is a block diagram of a configuration of a second embodiment according to the present invention.

A block structure shown FIG. 14 includes a function of a dictionary retrieval. A dictionary memory 30 stores a plurality of dictionary code sequences. An unknown code sequence is supplied to an input register 32. A result of the dictionary retrieval is stored in an output register 34. A retrieval controller 36 controls the apparatus illustrated in accordance with a sequence shown in FIG. 15. A group of registers 38 are provided for the control. These registers are represented in FIG. 14 by reference characters CODE, AN, BN, JADR, CN, MODE, FLG and RLT.

A matching processor 40 carries out a matching between the unknown code sequence and the dictionary code sequence. One unknown code sequence and one dictionary code sequence are placed in the registers 42 and 44, respectively, by the retrieval controller 36. An ADR1 counter 46 designates a read address ADR1 for an A-register 42. An ADR2 counter 48 designates a read address ADR2 for a B-register 44. An comparator 50 compares a code A(ADR1) from the A-register 42 with a code B(ADR2) from the B-register 44. A compared result is sent to a matching controller 52. This matching controller 52 controls the matching processor 40 and has a CNT counter 54 associated with a control of a matching sequence. The matching controller 52 is accessible to the registers AN, BN, MODE (only b1), FLG and RLT. The code read out from the B-register 44 is also sent to the matching controller 52. The counters 46 and 48 are controlled by the matching controller 52.

Figure 15:
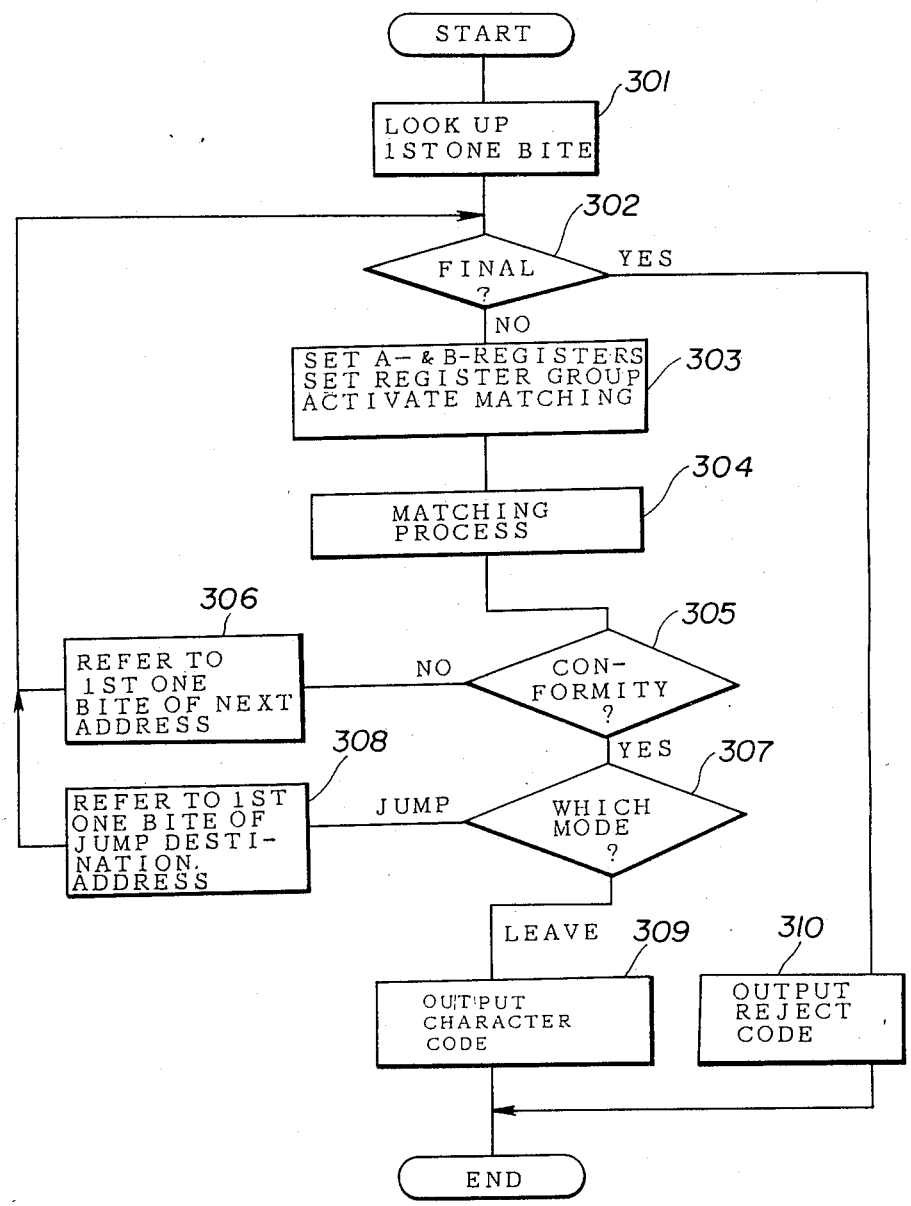
FIG. 15 is a flow chart showing a sequence of a dictionary retrieval carried out in the second embodiment.

FIG. 15 shows an overall sequence of a dictionary retrieving process. Step 304 is a step executed by the matching processor 40, and the other steps are executed by the retrieval controller 36.

FIG. 16 shows an example of a structure of a dictionary stored in the dictionary memory 30. As shown in this figure, the dictionary is composed of many dictionary units. Each dictionary unit consists of a dictionary code sequence of a variable length, a character code (one bite), a mode identifier (one bite), a jump destination address (one bite), and a number of codes forming a dictionary code sequence (one bite).

The mode identifier designates the matching mode (the partial correspondence or the overall correspondence), and a control manner of a sequence of the dictionary retrieval to be performed after an unknown code sequence matches with a dictionary code sequence. The jump destination address indicates a top address of a dictionary unit to be used in the next matching process, when the unknown and dictionary code sequences match. Special codes described previously may be inserted into the dictionary code sequence if necessary. A code FF is placed as a terminator at the last part of the dictionary.

A detailed example of the dictionary having the structure shown in FIG. 16 is shown in FIG. 17. References I to V represent the dictionary units. The character code of numeral 0 at the top of the dictionary unit is a reject code. The special code 0 may be placed in dictionary code sequences. Codes other than the special code 0 in the dictionary code sequence are directional codes.

A description will be given on a relationship between operational modes of the apparatus and mode identifiers. A general expression of the mode identifier is defined as [b1, b2].

Referring to FIG. 17, a mode identifier [00] which is set in the dictionary unit I, for example, indicates the matching based on the partial correspondence. In this matching, when the unknown code sequence matches with the dictionary code sequence of the unit having the mode identifier [00], the matching is completed and leaves the dictionary. Alternatively, when the matching sequences do not match, the matching is made with the dictionary code sequence of the dictionary unit subsequent to the dictionary unit having the above mode identifier [00]. In this example, the matching process proceeds to the unit II.

A mode identifier [01] which is set in the dictionary unit II, for example, also indicates the matching process based on the partial correspondence. In this matching, when the unknown code sequence matches with the dictionary code sequence of the unit having the mode identifier [01], a matching is made with the dictionary code sequence of the dictionary unit which is designated by the jump destination address. In this example, the jump destination address in the unit II indicates the unit IV. Therefore, the matching process jumps from the units II to IV. To the contrary, when the sequences do not match, the matching is made with the dictionary code sequence of the dictionary unit positioned directly after the unit having the above mode identifier. In this example, the matching process proceeds to the unit III.

A mode identifier [10] which is set in the dictionary unit IV, for example, indicates the matching process based on the overall correspondence. In this case, when the unknown code sequence matches with the dictionary code sequence of the unit having the mode identifier [10], the matching process leaves the dictionary. To the contrary, when neither of the code sequences match each other, the matching process is made with the dictionary code sequence of the dictionary unit subsequent to the unit having the above identifier [10]. In this example, the matching process proceeds to the unit V.

A mode identifier [11] which is set in the dictionary component unit III, for example, indicates the matching process of the overall correspondence. In this case, when the unknown code sequence matches with the dictionary code sequence of the unit having the mode identifier [11], a matching is made with the dictionary code sequence of the dictionary unit designated by the jump destination address. In this example, the jump destination address in the unit III indicates the unit V. Therefore, the matching process jumps from the unit III to V. Alternatively, when neither of the code sequences match each other, a matching is made with the dictionary code sequence of the dictionary unit subsequent to the unit having the identifier [11]. In this example, the matching process proceeds to the unit IV.

Figure 18:
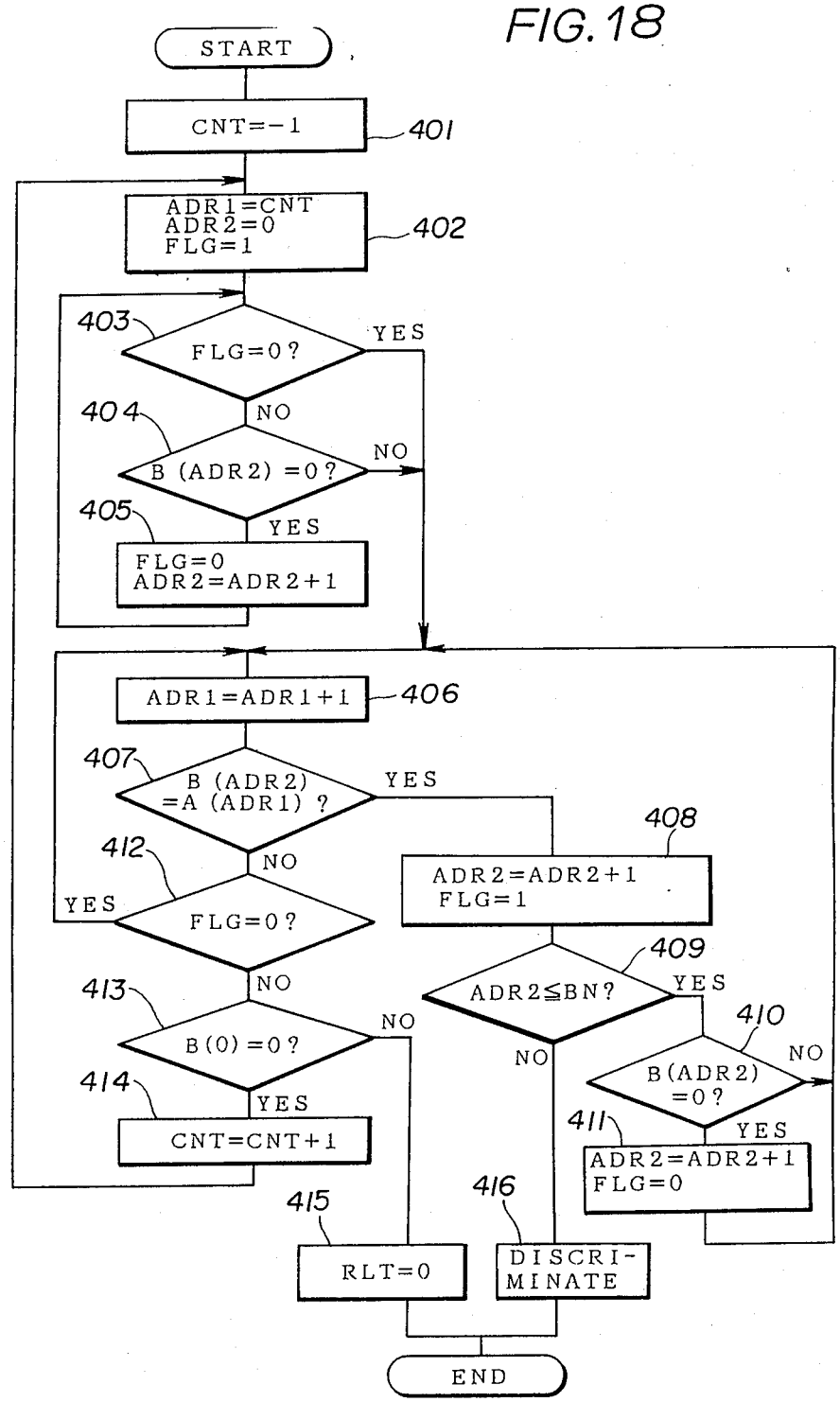
FIGS. 18 and 19 are flow charts showing a sequence of a matching process carried out in the second embodiment.
Figure 19:
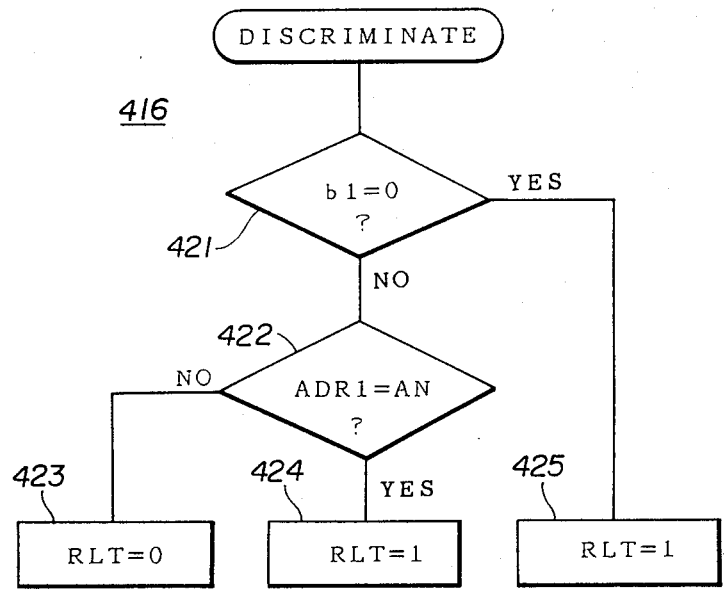

FIG. 18 shows a sequence of operation of the matching processor 40 shown in FIG. 14, and FIG. 19 shows a sequence of a detailed process of step 416. A description will be given of a matching process of the configuration shown in FIG. 14.

When the matching controller 52 is activated by the retrieval controller 36, it sets the CNT counter 54 to −1 as an initial setting (step 401).

Step 402 is a step for an initial setting for a matching process defined by a sequence of steps starting with step 403. At step 402, the matching controller 52 sets the ADR1 counter 46 to the value of the CNT counter 54 and also sets the ADR2 counter 48 to 0. At the same time, the matching controller 52 sets the FLG register of the group of the registers 38 to 1.

Then, at step 403, the matching controller 52 checks whether or not the FLG register is reset. If the FLG register is in the reset state, the matching controller 52 jumps to the step 406. Alternatively if the FLG register is in the set state, the matching controller 52 checks whether or not an output code of the B-register 44 is the special code 0 (step 404). The output code of the B-register 44 is a code in the dictionary code sequence which is designated by an address by the ADR2 counter 48. If this code is not the special code, the matching controller 52 jumps to step 406. Alternatively if the code is the special code, the matching controller 52 resets the FLG register and increments the count of the ADR2 counter 48 by 1 in (step 405). Then, the matching controller 52 returns to step 403.

At step 406, the matching controller 52 increments the count of the ADR1 counter 46 by 1 and reads out the code designated by the next address from the A-register 42. Then, the controller 52 checks whether or not both the codes are identical to each other (step 407).

If both the codes are identical, the matching controller 52 increments the count of the ADR2 counter 48 by 1 and reads out the code designated by the next address from the B-register 44 (step 408). At the same time, the matching controller 52 sets the FLG register to 1. Then, the matching controller 52 checks whether or not the current value of the ADR2 counter 48 is equal to or less than a value of the BN register (step 409). The number of codes forming the dictionary code sequence is set beforehand in the BN register by the retrieval controller 36.

If the result at step 409 is affirmative, the matching controller 52 checks whether or not the code from the B-register 44 is the special code (step 410). If the result at step 410 is negative, the matching controller 52 returns to step 406. Then the matching controller 52 increments the count of the ADR1 counter 46 by 1 and reads out the code designated by the next address from the A-register 42 (step 411). Alternatively, if the code from the B-register 44 is the special code 0, the matching controller 52 increments the count of the B-register 44 by 1 and then reads out a code (step 411). At this time, the matching controller 52 resets the FLG register and then returns to step 406.

If the result at step 409 is negative, the matching controller 52 proceeds to step 416. Step 416 is shown in detail in FIG. 19. At step 421 the matching controller 52 checks whether or not the value of b1 stored in the MODE register is 0. The mode identifier is stored beforehand in the MODE register, by the retrieval controller 36. If b1=0, that is, the matching based on the partial correspondence is designated, the matching controller 52 decides that the unknown and dictionary code sequences match and sets the RLT register to 1 (step 425).

Alternatively if the value of B(0) is not equal to 0 at step 413, or the matching based on the overall correspondence is designated, the matching controller 52 checks whether or not the value of the ADR1 counter 46 is the same as the count of the AN register (step 422). The number of the codes of the unknown code sequence is set beforehand in the AN register by the retrieval controller 36.

If both the values are identical to each other at step 422, or the matching proceeds to the last code of the unknown code sequence, the matching controller 52 decides that the unknown and dictionary code sequences match each other, and sets the RLT register (step 424). Alternatively if both the values are not identical in the step 422, the matching controller 52 decides that they are mismatched, and resets the RLT register (step 423).

Returning to FIG. 18, when both the codes are different at step 407, the matching controller 52 checks whether or not the FLG register is set (step 412). If the FLG register is in the reset state, the matching controller 52 returns to step 406 and reads out a code designated by the next address from the A-register 42. If the FLG register is in the set state at step 412, the matching controller 52 checks whether or not the value of the B(0) is 0 (step 413). In the case where the B(0) is not equal to 0, the matching controller 52 decides that neither of the unknown and dictionary code sequences match each other (step 415). Alternatively in the case where the B(0) is equal to 0, the matching controller 52 increments the count of the CNT counter 54 by 1 (step 414) and returns to the step 402. Therefore, the matching is tried again. In this case, the matching is initiated starting with the code in the A-register 42 designated by the address directly after the address which is the start address in the previous matching.

When the matching controller 52 proceeds to steps 415, 423, 424 and 425, it acknowledges the termination of the matching process to the retrieval controller 36.

The matching process described above is further explained by use of concrete examples.

First, the matching operation based on the partial correspondence is described.

It is now assumed that the code sequence shown in FIG. 5 is set in the A-register 42 by the retrieval controller 36. It is further assumed that the dictionary code sequence shown in FIG. 20A is set in the B-register 44 by the retrieval controller 36. Transitions of addresses, codes and flag in this case are shown in FIG. 21. It is moreover assumed that the b1 in the MODE register shown in FIG. 14 is set to 0 by the retrieval controller 36.

The matching controller 52 is activated, and sets the FLG register to 1 and reads out the code of designated by the address 0 from the B-register 44. In this example, the code designated by the address 0 is not the special code 0. Therefore, the matching controller 52 reads out the code designated by the address 0 from the A-register 42 (step 1 in FIG. 21). Both the codes from the registers 42 and 44 are 4 and are identical to each other. Therefore, the matching controller 52 increments the count of the ADR2 counter 48 by 1 and reads out the code designated by the address 1 (step 2).

Since this code is the special code 0, the matching controller 52 resets the FLG register and increments the count of the ADR2 counter 48 by 1, so that the code corresponding to the address 2 is read out from the B-register 44 (step 3).

This code is 2 and is different from the code 4 from the A-register 42. Therefore, the matching controller increments the count of the ADR1 counter 46 by 1 and reads out the data designated by the address 1 from the A-register 42 (step 4). The code read out is 1 and is different from the code 2 from the B-register 44. At this time, the FLG register is in the reset state. Therefore, the matching controller 52 increments the count of the ADR1 counter by 1 and reads out the code designated by the address 2 from the A-register 42 (step 5).

The code from the A-register 42 is 2 and is identical to the code 2 from the B-register 44. Therefore, the matching controller 52 sets the FLG register and increments the count of the ADR2 counter 48 by 1, so that the code following the code 2 is read out from the B-register 44. Since this code is 0, the matching controller 52 resets the FLG register and increments the count of the ADR2 counter 48 by 1. Then, the code following the code 0 is read out from the B-register (step 7).

This code is 4 and is not 0. Therefore, the matching controller 52 increments the count of the ADR1 counter 46 by 1 and reads out the code designated by the address 3 from the A-register 42 (step 8). This code is 1 and is different from the code 4 from the B-register 44. In addition, the FLG register is in the reset state. Therefore, the matching counter 52 increments the count of the ADR1 counter 44 by 1 and reads out the code designated by the address 4 from the A-register 42 (step 9). Since both the codes are 4, the matching controller 52 sets the FLG register. At this time, the count of the ADR2 counter 48 is incremented to the address (address 4) corresponding to the last code of the dictionary code sequence. Thus, the matching controller 52 decides that the unknown and dictionary code sequences match and sets the RLT register. The flag of the RLT register represents the result of the discrimination.

In this way, the matching proceeds by controlling the order of the comparison between the code from the A-register 42 and the code from the B-register 44. In this example, the codes of the addresses 1 and 3 stored in the A-register 42 are neglected due to the special codes 0 inserted into the dictionary code sequence in the B-register 44. In addition, the present example is based on the partial correspondence as the matching mode. For these reasons, the codes of the addresses 0, 2 and 4 of the unknown sequence designated coincides the codes of the addresses 0, 2 and 4 of the dictionary code sequence designated, respectively. As a result, the matching controller 52 decides that the unknown and dictionary code sequences match each other.

In the case of the matching of the code sequence shown in FIG. 5 with the dictionary code sequence 20B, addresses, codes and flag vary as shown in FIG. 22. As shown in FIG. 22, the codes of the unknown and dictionary code sequences do not correspond to each other at step 7. Therefore, the matching process proceeds to step 415 shown in FIG. 19, so that the matching controller 52 decides that neither of the unknown and dictionary code sequence match each other.

A matching of the code sequence shown in FIG. 5 with a dictionary code sequence shown in FIG. 20C is described. Transitions of addresses, codes and flag in this case are shown in FIG. 23.

First of all, the matching controller 52 reads out the code of the address 0 of the dictionary code sequence (step 1). The code at step 1 is the special code 0. Therefore the matching proceeds to step 405 in FIG. 18. The matching controller 52 resets the FLG register and increments the count of the ADR2 counter 48 by 1. Therefore, the code 4 of the address 1 of the dictionary code sequence is read out. This code 4 is a start code for comparison with the unknown code sequence.

The matching of codes is successively made by the sequence shown in FIG. 23. Then, both the codes do not correspond to each other at step 10 where the address of the code of the dictionary code sequence is 4, which is the last address. However, since the B(0) is 0, the process of the matching controller 52 returns to step 402 in FIG. 18. Thus, a second matching is activated starting with step 11 in FIG. 23. In the second matching, the code of the address 0 of the unknown code sequence is neglected. That is, the code of the address 1 of the unknown code sequence is a start code in the second matching.

The matching process goes on and reaches step 22 in FIG. 23. At step 22, the last code of the unknown code sequence coincides with the last code of the dictionary code sequence. Then, the process proceeds to step 409 via step 408, and further to step 416. Consequently, the matching controller 52 decides that the unknown and dictionary code sequences match.

If a third matching is activated, the codes of the addresses 0 and 1 of the unknown code sequence are neglected. That is, the code sequence starting with the address 2 is subject to the third matching.

A matching process based on the overall correspondence carried out in the configuration shown in FIGS. 14 is described.

In the matching process based on the overall correspondence, when the matching controller 52 detects that all the codes of the dictionary code sequence exist in the unknown code sequence, it checks whether or not the matching process has reached the last code of the unknown code sequence (step 422 in FIG. 19). If the matching has reached the last code, the matching controller 52 decides that the unknown and dictionary code sequences match. Alternatively, if not, the matching controller 52 decides that neither of the unknown and dictionary code sequences match.

In a matching of the unknown code sequence with a dictionary code sequence shown in FIG. 24A, all the codes of the dictionary code sequence are detected in the unknown code sequence, when the matching with the code of the address 1 of the unknown code sequence is made. At this time, the matching has not yet reached the last code of the unknown code sequence. Therefore, the matching process proceeds from step 422 to step 423 shown in FIG. 19 and it is decided that neither of the code sequences match each other.

A matching of the unknown code sequence shown in FIG. 5 with a dictionary code sequence shown in FIG. 24B is almost similar to the above matching.

In a matching of the unknown code sequence shown in FIG. 5 with a dictionary code sequence shown in FIG. 24C, all the codes (3, 4, 1) of the dictionary code sequence are found in the unknown code sequence at the last address thereof. Therefore, it is decided that the unknown code sequence matches with the dictionary code sequence.

A description will be given on a dictionary retrieving process made in the configuration shown in FIG. 14. In this operation, it is assumed that the unknown code sequence shown in FIG. 5 is applied to the input register 32. It is further assumed that the dictionary shown in FIG. 17 is used. In the illustrated dictionary, the dictionary code sequences of the dictionary units I, II and V are the same as the sequences shown in FIGS. 20B, 20A and 20C, respectively.

Referring to FIG. 15, the retrieval controller 36 puts the unknown code sequence in the A-register 42, and also puts the number of the codes thereof in the FLG register (step 301). The retrieval controller 36 has a pointer for dictionary access. At step 301, the pointer is set to the dictionary address 0.

Then, the retrieval controller 306 checks whether or not one bite data of the dictionary address designated by the pointer is the terminator FF. When the dictionary address is read out from the pointer for the first time, the retrieval controller 36 checks the character code of the dictionary address 0 in the dictionary unit I. Then, the process of the retrieval controller 36 jumps to step 303.

When step 303 is processed for the first time, the retrieval controller 36 reads out the dictionary component unit I. Then, the retrieval controller 36 provides CODE, MODE, JADR, BN, and B registers with the character code ($\alpha$), the mode identifier, the jump destination address, the number of the codes forming dictionary code sequence and the dictionary code sequence, respectively. Then, the retrieval controller 36 sets the the pointer to the address (8) which is the top address of the dictionary unit II. Then, the retrieval controller 36 activates the matching controller 52.

By the control of the matching controller 52, the matching of the unknown code sequence in the A-register 42 with the dictionary code sequence in the B-register 44 is made as described previously with reference to FIGS. 18 and 19 (step 304). When the result of the matching is decided, the matching controller 52 provides the retrieval controller 36 with an acknowledgement of the termination.

Subsequently, the retrieval controller 36 checks the value of the RLT register (305). The flag in the RLT register indicates the result of the matching as mentioned above. The first matching is made between the unknown code sequence and the dictionary code sequence of the dictionary component unit I. This dictionary code sequence is the same as that shown in FIG. 20B. Therefore, as described before, neither of the code sequences match. Thus, the value of the RLT register is set to 0. Accordingly, the process of the retrieval controller 36 proceeds to step 306. At this step, the retrieval controller 36 refers to one data of the address designated by the pointer and checks step 302. In this case, the pointer designates the top address of the dictionary unit II. Since the one bite data is not the terminator, the retrieval controller 36 reads out the dictionary unit II. Then, the dictionary code sequence of the unit II is stored in the B-register 44. The other control data of the unit II are placed in the corresponding registers. Therefore, the retrieval controller 36 activates the matching controller 52 (step 303).

The matching with the dictionary component unit II is successful as mentioned before with reference to FIG. 20A, the retrieval controller 36 checks the value (mode identifier) in the MODE register (step 307). The value in the MODE register is [01], the retrieval controller 36 sets the pointer to the jump destination address designated in the dictionary unit II, and refers to the control data placed at the top of the dictionary unit IV (step 308) and checks step 302.

The data is not the terminator. Thus, the process of the retrieval controller 36 proceeds to step 303 at which the retrieval controller 36 provides the B-register 44 with the dictionary code sequence of the dictionary unit IV and also provides the registers with the corresponding bite data. After that, the retrieval controller 36 activates the matching controller 52.

The unknown code sequence does not match with the dictionary code sequence of the unit IV. Therefore, the matching process proceeds to successive steps 305, 306 and 303, so that the matching of the unknown code sequence with the dictionary code sequence of the unit V is made. Both the code sequences match as mentioned before with reference to FIG. 20C. Thus, the matching process proceeds to step 307. Since the mode identifier in the MODE register is [00], the matching process proceeds to step 309. At this step, the retrieval controller 36 provides the output register 34 with the character code (α) set in the CODE register and leaves the dictionary. That is, the retrieval process is terminated.

If the neither of the unknown and dictionary code sequences match, the retrieval controller 36 would detect the terminator. As a result, the matching process proceeds to step 310 and the reject code is supplied to the output register 34. Then, the retrieving process is terminated.

Figure 25:
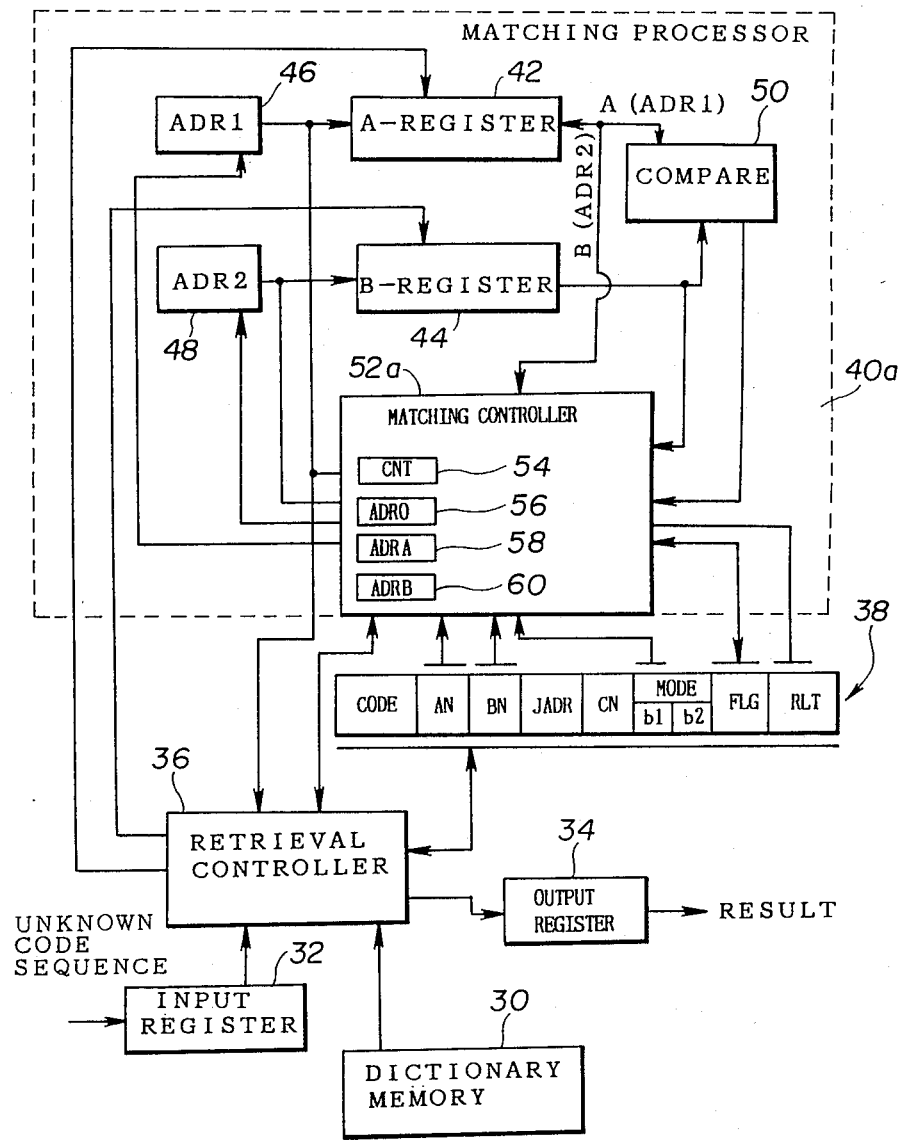
FIG. 25 is a block diagram of a configuration of a third embodiment according to the present invention.

FIG. 25 shows a configuration of a third embodiment according to the present invention. In FIG. 25, the same elements as those in FIG. 14 are indicated by the same reference numerals.

The configuration shown in FIG. 25 differs from the configuration shown in FIG. 14 in the following. That is, a matching controller 52a is configured by adding an ADR0 counter 56, an ADRA counter 58 and an ADRB counter 60 to the matching controller 52 shown in FIG. 14. Further, the output code of the A-register 42 is supplied to the matching controller 52a. A sequence of matching executed in the configuration shown in FIG. 25 somewhat differs from that in the configuration shown in FIG. 14 as explained later. Moreover, a data structure of the dictionary stored in the memory 30 as well as the structure of the unknown code sequence which is stored in the A-register 42 somewhat differs from those in the configuration in FIG. 14.

An explanation will be given on the configuration shown in FIG. 25, focusing on the above differences.

An example of the dictionary used in the configuration shown in FIG. 25 is shown in FIG. 26. As apparent from comparison of FIG. 26 with FIG. 16, in the dictionary shown in FIG. 26, information (data) indicating quantity such as length of area of each directional code is placed directly after each corresponding code. The data of quantity represents a length or area of a stroke associated with the code located immediately prior to the data of quantity. The special code described previously is provided with data of a value 0. The other configurations of the dictionary shown in FIG. 26 are the same as those of the dictionary shown in FIG. 14.

Figure 27:
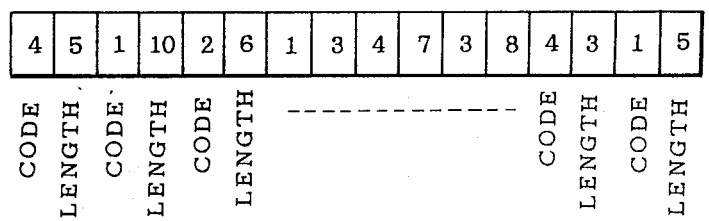
FIG. 27 is a view showing an example of an input unknown code sequence having length information which is used in the third embodiment.

FIG. 27 shows an example of an unknown code sequence applied to the input register 32. As shown in this figure, the unknown code sequence used for the configuration shown in FIG. 25 are composed of directional codes and corresponding length data.

In a matching of the unknown code sequence with the dictionary code sequence mentioned above, the present embodiment carries out not only comparison between the codes but also comparison between the lengths. For comparing lengths, the registers 56, 58 and 60 described before are prepared.

Figure 28:
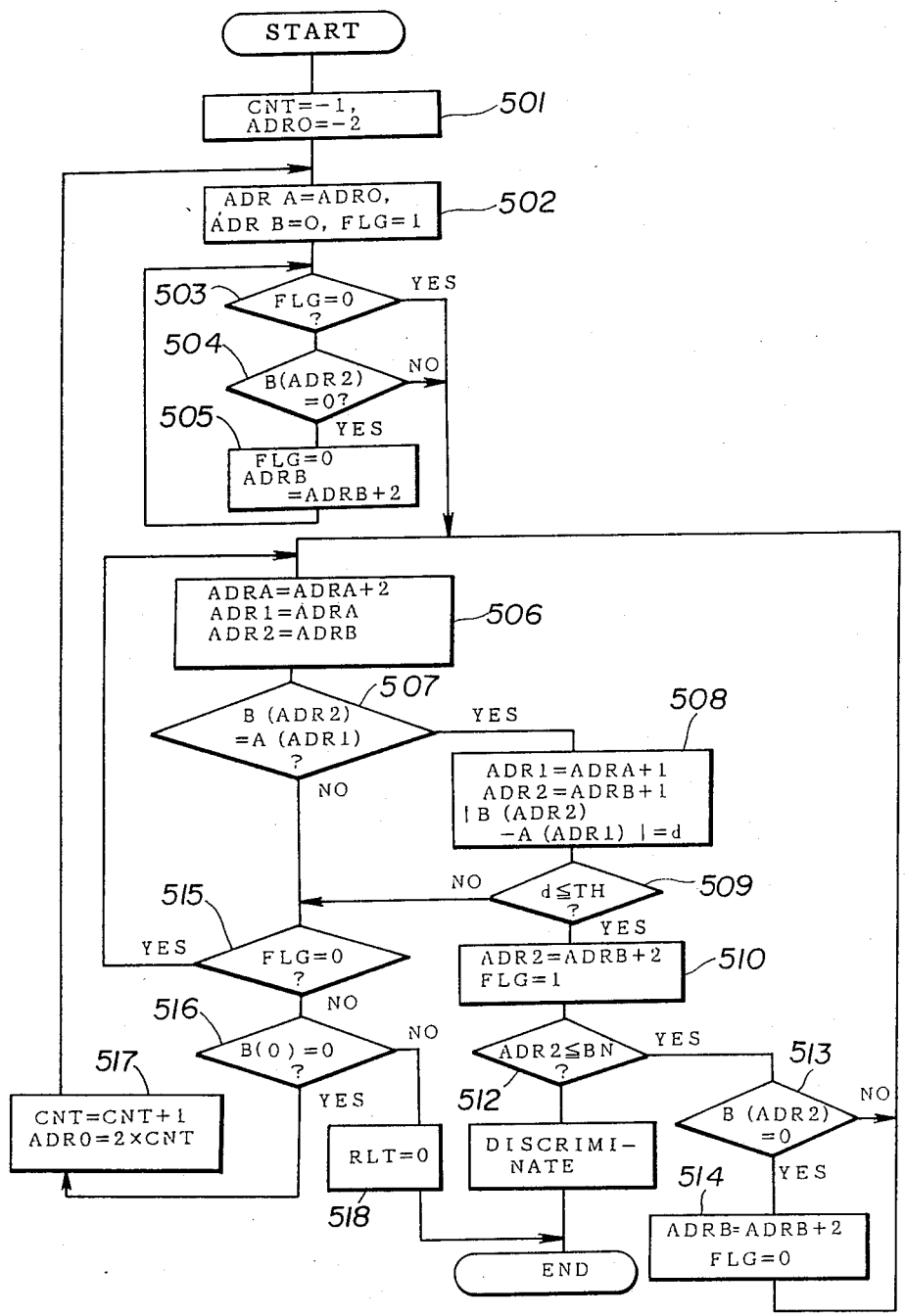
FIG. 28 is a flow chart showing a sequence of a pattern matching process carried out in the third embodiment.

FIG. 28 shows a control sequence of the matching processor 40a. Step 512 is the same as the step 416 shown in FIG. 18 and a process at step 512 is the same as that shown in FIG. 19.

The most important feature of the embodiment is as follows. That is, when the code of the unknown code sequence coincides with the code of the dictionary code sequence at step 507, an absolute value of a difference in length between these codes is compared with a threshold length TH (which is equal to 2, for example) at step 509. If the absolute value of the difference is greater than the length TH, the matching controller 52a decides that both the codes are not identical to each other. This is the most important feature of this embodiment. That is, the third embodiment differs from the first and second embodiments in that the matching is carried out on the basis of comparison between directional codes as well as between lengths associated with the codes.

A description will be given of a matching process of the embodiment shown in FIG. 25, by referring to FIG. 28.

The matching controller 52a is activated by the retrieval controller 36 and then sets the CNT and ADR0 counters 54 and 56 to −1 and −2, respectively (step 501).

Step 502 is a step for an initial setting for a matching process defined by a sequence of steps starting with a step 503. At step 502, the matching controller 52a sets the ADRA counter 58 to the count of the ADR0 counter 56 and also sets the ADRB counter 60 to 0. Also, the matching controller 52a sets the FLG register of the register group 38 to 1.

Then, the matching controller 52a checks whether or not the FLG register is in the reset state (step 503). If the FLG register is in the set state, the matching controller 52 checks whether or not an output code of the B-register 44 designated by the address 0 is the special code 0 (step 504). If this code is not the special code, the matching controller 52 jumps to step 506. Alternatively if the code is the special code, the matching controller 52a resets the FLG register and increments the count of the ADRB counter 60 by 2 (step 505). Then, the matching controller 52a returns to step 503.

When the matching process jumps from the step 503 or 504 to step 506, the matching controller 52a increments the count of the ADRA counter 58 by 2. Further, the matching controller 52a sets the ADR1 and ADR2 counters 46 and 48 to the values of the ADRA and ADRB counters 58 and 60, respectively. As a result, the code of the address designated by the ADR1 counter 46 is read out from the A-register 42, and the code of the address designated by the ADR2 counter 48 is read out from the B-register 44. Then both the codes are compared by the comparator 50.

The matching controller 52a checks the output of the comparator 50 (step 507). If both the codes are the same, the process proceeds to step 508 and alternatively if not, the process proceeds to step 515.

In the case that both the codes are the same, the matching controller 52a sets the ADR1 counter 46 to a value obtained by adding 1 to the count value of the ADRA counter 58 (step 508). Further, the matching controller 52a sets the ADR2 counter 48 to a value obtained by adding 1 to the count value of the ADRB counter 60 (step 508). Then, the length data relative to the codes which have been recognized to be the same at the step 507 are read out from the A- and B-registers 42 and 44. The matching controller 52a calculates the absolute value of the difference between the lengths (step 508). Then, the matching controller 52a checks whether or not the calculated absolute value is equal to or less than the predetermined length TH (step 509). If the result is affirmative, the matching controller 52a decides both the code sequences match and proceeds to step 510. To the contrary, if the result at step 509 is negative, the matching controller 52a decides that neither of the sequences match and proceeds to step 515.

When the process proceeds to step 510, the matching controller 52a sets the ADR2 counter 48 to a value obtained by adding 2 to the count value in the ADRB counter 60 and sets the FLG register. Then, the matching controller 52a checks whether or not the value of the ADR2 counter 48 is equal to or less than the value in the BN register (step 511). In the BN register, the number of the codes in the dictionary code sequence is registered beforehand by the retrieval controller 36.

If the result at step 511 is affirmative, the matching controller 52a checks the output code of the B-register 44 (which is designated by the ADR2 counter 48) is 0, or the special code (step 513). If the result is negative, the matching process returns to step 506. Alternatively if the result at step 513 is affirmative, the matching controller 52a increments the count of the ADRB register 60 by 2 and resets the FLG register (step 514). Then, the step returns to step 506.

If the result at step 511 is negative, the matching controller 52a carries out the step 512, which is shown in FIG. 19. Then, the matching controller 52a sets or resets the RLT register depending on the result at step 421 or 422.

When the result at step 507 is negative, or when the result at step 509 is negative, the matching controller 52a checks whether of not the FLG register is in the reset state (step 515) and returns to step 506 if the result is affirmative. Alternatively if the FLG register is in the set state, the matching controller 52a checks whether or not the value of the B(0) is 0 (step 516). If the B(0)=0, the matching controller 52a decides that neither of the code sequences match and resets the FLG register (518). Then, the matching is terminated. If the result at step 516 is affirmative, the matching controller 52a increments the count of the CNT counter by 1 and then sets the ADR0 register 56 to a value obtained by doubling the value in the CNT register 54 (step 517). Then, the matching controller 52a tries the matching process again.

When the matching process proceeds to steps 512 or 518, the matching controller 52a outputs the termination of the matching process.

Concrete examples are shown below. It is assumed that an unknown code sequence shown in FIG. 29 is stored in the A-register associated with addresses illustrated. It is further assumed that a dictionary code sequence shown in FIG, 30A is stored in the B-register 44. When the matching process based on the partial correspondence is carried out for these code sequences, transitions of addresses, codes and flag vary as shown in FIG. 31. As clearly shown in this figure, the unknown code sequence matches with the dictionary code sequence. In this example, the threshold value TH at step 509 is set to 2.

A dictionary code sequence shown in FIG. 30B is different from that of FIG. 30A in the length of the address 9. The unknown code sequence does not match with the code sequence shown in FIG. 30B.

As described above, it is possible to enhance the accuracy of matching by comparing codes and quantities associated with codes.

Figure 32A:
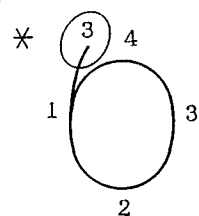
FIGS. 32A and 32B are views each showing concrete patterns which are processed in the third embodiment.
Figure 32B:
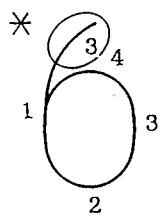

In this regard, a practical example is shown with reference to FIGS. 32A and 32B. FIG. 32A shows a handwritten numeral pattern "0" and FIG. 32B shows a handwritten numeral pattern "6". Directional codes are shown for each pattern. As shown, both the patterns have the same code sequence (1, 2, 3, 4, 3). Therefore, if the matching is made by use of only directional codes, both the codes would be recognized to be the same. However, a difference in stroke indicated by symbols * between the patterns is conspicuous. The third embodiment recognizes patterns by use of comparison between directional codes and comparison between lengths. According to the third embodiment, the code sequence shown in FIG. 32A matches with the dictionary code sequence of numeral "0", but does not match the dictionary code sequence of numeral "6". Similarly, the code sequence shown in FIG. 32b matches with the dictionary code sequence of numeral "6", but does not match with the dictionary code sequence of numeral "0".

The present invention is not limited to the embodiments, but various variations and modifications may be made without departing from the scope of the present invention. For example, it is possible to use 8 directional codes in place of the 4 directional codes.

What is claimed is:

1. A code sequence matching method adapted to pattern recognition of characters, comprising the steps of:
   successively selecting one code from an unknown code sequence which is extracted from an input pattern and indicates the sequence of features of the input pattern;
   successively selecting one code from a reference code sequence;
   comparing said one code selected from the unknown code sequence with said one code selected from the reference code sequence;
   discriminating whether or not the unknown code sequence and the reference code sequence match each other by checking the correspondence between the codes of the unknown code sequence and the codes of the reference code sequence on the basis of compared results;
   wherein the reference code sequence has one or more special codes for controlling the order of comparison between the codes of the unknown code sequence and the codes of the reference code sequence and said selecting steps select said codes in accordance with said special codes; and
   wherein when both the codes of the unknown and reference code sequences are identical to each other at said comparing step, subsequent codes are selected from the unknown and reference code sequences and compared with each other, and wherein when said special code is selected from the reference code sequence, a code subsequent to said special code is selected from the reference code sequence and compared with said one code selected from the unknown code sequence.

2. A code sequence matching method as claimed as claim 1, wherein when said code subsequent to the special code is different from said one code selected from the unknown code sequence, one code subsequent to said one code is selected from the unknown code sequence and compared with said code subsequent to the special code.

3. A code sequence matching method as claimed as claim 2, wherein said selecting step of selecting one code from the unknown code sequence is repeated until a code identical to said code subsequent to the special code is selected from the unknown code sequence.

4. A code sequence matching method adapted to pattern recognition of characters, comprising the steps of:
   successively selecting one code from an unknown code sequence which is extracted from an input pattern and indicates the sequence of features of the input pattern;
   successively selecting one code from a reference code sequence;

comparing said one code selected from the unknown code sequence with said one code selected from the reference code sequence;

discriminating whether or not the unknown code sequence and the reference code sequence match each other by checking the correspondence between the codes of the unknown code sequence and the codes of the reference code sequence on the basis of compared results;

wherein the reference code sequence has one or more special codes for controlling the order of comparison between the codes of the unknown code sequence and the codes of the reference code sequence and said selecting steps select said codes in accordance with said special codes;

wherein said reference code sequence further comprises a mode code for defining correspondence between the unknown and reference code sequences; and wherein said mode code defines an overall correspondence and a partial correspondence.

5. A code sequence matching method as claimed in claim 4, wherein in a case where said mode code designates said overall correspondence, when said compared results show that the reference code sequence is included in the unknown code sequence, and at this time the last code of the unknown code sequence is selected, it is decided that the unknown code sequence matches with the reference code sequence.

6. A code sequence matching method as claimed in claim 4, wherein in a case where said mode code designates said partial correspondence, when said compared results show that the reference code sequence is included in the unknown code sequence, it is decided that the unknown code sequence matches with the reference code sequence, even though the last code of the unknown code sequence has not yet been selected.

7. A code sequence matching apparatus adapted to pattern recognition of characters, comprising:

first register means for storing an input code sequence which is extracted from an input pattern and indicates the sequence of features of said input pattern;

second register means for storing a reference code sequence;

comparing means for comparing one code read out from said first register means with one code read out from said second register means;

controlling means for discriminating whether or not the unknown code sequence and the reference code sequence match each other by checking the correspondence between the codes of the unknown code sequence and the codes of the reference code sequence on the basis of compared results;

wherein the reference code sequence has one or more special codes for controlling the order of comparison between the codes of the unknown code sequence and the codes of the reference code sequence and said controlling means controls the reading out operation of said first and second register means depending on said special codes; and wherein said reference code sequence further comprises a mode code for defining a correspondence between the unknown and reference code sequences, and wherein in a case where said mode code designates an overall correspondence, when said controlling means detects that said compared results show that the reference code sequence is included in the unknown code sequence, and at this time the last code of the unknown code sequence is selected, said controlling means decides that the unknown code sequence matches with the reference code sequence.

8. A code sequence matching apparatus adapted to pattern recognition of characters, comprising:

first register means for storing an input code sequence which is extracted from an input pattern and indicates the sequence of features of said input pattern;

second register means for storing a reference code sequence;

comparing means for comparing one code read out from said first register means with one code read out from said second register means;

controlling means for discriminating whether or not the unknown code sequence and the reference code sequence match each other by checking the correspondence between the codes of the unknown code sequence and the codes of the reference code sequence on the basis of compared results;

wherein the reference code sequence has one or more special codes for controlling the order of comparison between the codes of the unknown code sequence and the codes of the reference code sequence and said controlling means controls the reading out operation of said first and second register means depending on said special codes;

wherein said reference code sequence further comprises a mode code for defining a correspondence between the unknown and reference code sequences, and wherein in a case where said mode code designates a partial correspondence, when said controlling means detects that said compared results show that the reference code sequence is included in the unknown code sequence, said controlling means decides that the unknown code sequence matches with the reference code sequence, even through the last code of the unknown code sequence has not yet been selected.

* * * * *